(12) United States Patent
Chen et al.

(10) Patent No.: US 10,007,093 B2
(45) Date of Patent: Jun. 26, 2018

(54) IMAGING LENS ASSEMBLY, IMAGE CAPTURING APPARATUS AND ELECTRONIC DEVICE

(71) Applicant: LARGAN PRECISION CO., LTD., Taichung (TW)

(72) Inventors: Kuan-Ming Chen, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days. days.

(21) Appl. No.: 15/280,138

(22) Filed: Sep. 29, 2016

(65) Prior Publication Data

US 2018/0024322 A1 Jan. 25, 2018

(30) Foreign Application Priority Data

Jul. 19, 2016 (TW) .............................. 105122733 A

(51) Int. Cl.
| | |
|---|---|
| *G02B 3/02* | (2006.01) |
| *G02B 13/00* | (2006.01) |
| *G02B 9/62* | (2006.01) |
| *G02B 27/00* | (2006.01) |
| *H04N 5/225* | (2006.01) |

(52) U.S. Cl.
CPC ........... *G02B 13/0045* (2013.01); *G02B 9/62* (2013.01); *G02B 27/0025* (2013.01); *H04N 5/2253* (2013.01); *H04N 5/2254* (2013.01)

(58) Field of Classification Search
CPC .............. G02B 13/001; G02B 13/0015; G02B 13/002; G02B 13/0045
USPC ......................................................... 359/713
See application file for complete search history.

(56) References Cited

U.S. PATENT DOCUMENTS

| | | | |
|---|---|---|---|
| 2014/0254029 A1* | 9/2014 | Hsu ........................ | G02B 5/005 359/713 |
| 2015/0253547 A1 | 9/2015 | Sun | |
| 2015/0362702 A1 | 12/2015 | Tang et al. | |

* cited by examiner

*Primary Examiner* — Robert E Tallman
(74) *Attorney, Agent, or Firm* — McClure, Qualey & Rodack, LLP

(57) ABSTRACT

An imaging lens assembly includes, in order from an object side to an image side, a first lens element, a second lens element, a third lens element, a fourth lens element, a fifth lens element and a sixth lens element. The third lens element has positive refractive power. The fifth lens element has both an object-side surface and an image-side surface being aspheric. The sixth lens element with negative refractive power has an object-side surface being concave in a paraxial region thereof, wherein an object-side surface and the image-side surface of the sixth lens element are aspheric.

27 Claims, 22 Drawing Sheets

IMAGING LENS ASSEMBLY, IMAGE CAPTURING APPARATUS AND ELECTRONIC DEVICE

RELATED APPLICATIONS

This application claims priority to Taiwan Application Serial Number 105122733, filed Jul. 19, 2016, which is herein incorporated by reference.

BACKGROUND

Technical Field

The present disclosure relates to an imaging lens assembly and an image capturing apparatus. More particularly, the present disclosure relates to a compact imaging lens assembly and an image capturing apparatus which are applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

In the conventional optical systems, a greater chief ray angle (CRA) of an imaging lens assembly brings both an exit pupil position and a principal point closer to an image surface, so that the back focal length could be effectively shorted and compactness of the imaging lens assembly could be maintained. However, an imaging lens assembly with compact size usually has a small chief ray angle and lacks the advantages of a greater chief ray angle. On the other hand, the size of the imaging lens assembly with the large chief ray angle is often much greater than the size of the image surface thereof. Hence, the imaging lens assembly is hard to satisfy the requirements of compact size for portable electronic devices.

Therefore, problems associated with the chief ray angle in the conventional imaging lens assemblies prevent having compact size thereof, so there is an urgent need in developing a high quality imaging lens assembly with features of both compact size and a proper chief ray angle.

SUMMARY

According to one aspect of the present disclosure, an imaging lens assembly includes, in order from an object side to an image side, a first lens element, a second lens element, a third lens element, a fourth lens element, a fifth lens element and a sixth lens element. The third lens element has positive refractive power. The fifth lens element has an object-side surface and an image-side surface being both aspheric. The sixth lens element with negative refractive power has an object-side surface being concave in a paraxial region thereof, wherein the object-side surface and an image-side surface of the sixth lens element are aspheric. The imaging lens assembly has a total of six lens elements. There is an air gap between every two of the first lens element, the second lens element, the third lens element, the fourth lens element, the fifth lens element and the sixth lens element that are adjacent to each other. When an incident angle of a chief ray at a maximum image height on an image surface of the imaging lens assembly is CRA1.0Y, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, an axial distance between the fourth lens element and the fifth lens element is T45, and an axial distance between the fifth lens element and the sixth lens element is T56, the following conditions are satisfied:

$38.0 \text{ degrees} \leq CRA1.0Y;$ $|f6| < |f3| < |f1|;$ $|f6| < |f3| < |f2|;$ $|f6| < |f3| < |f4|;$ $|f6| < |f3| < |f5|;$ and $0.70 < T56/T45.$ According to another aspect of the present disclosure, an image capturing apparatus includes the imaging lens assembly according to the aforementioned aspect and an image sensor, wherein the image sensor is disposed on the image surface of the imaging lens assembly.

According to another aspect of the present disclosure, an electronic device includes the image capturing apparatus according to the foregoing aspect.

According to another aspect of the present disclosure, an imaging lens assembly includes, in order from an object side to an image side, a first lens element, a second lens element, a third lens element, a fourth lens element, a fifth lens element and a sixth lens element. The imaging lens assembly has a total of six lens elements. There is an air gap between every two of the first lens element, the second lens element, the third lens element, the fourth lens element, the fifth lens element and the sixth lens element that are adjacent to each other. The imaging lens assembly further includes an aperture stop disposed between an imaged object and the third lens element. At least one surface of at least one lens element of the first lens element, the second lens element, the third lens element, the fourth lens element, the fifth lens element and the sixth lens element includes at least one critical point. When an incident angle of a chief ray at a maximum image height on an image surface of the imaging lens assembly is CRA1.0Y, an axial distance between an object-side surface of the first lens element and the image surface is TL, the maximum image height of the imaging lens assembly is ImgH, an entrance pupil diameter of the imaging lens assembly is EPD, and an axial distance between an image-side surface of the sixth lens element and the image surface is BL, the following conditions are satisfied:

$45.0 \text{ degrees} < CRA1.0Y;$ $0 < TL/(\tan(CRA1.0Y) \times ImgH) < 2.0;$ and $1.25 < EPD/BL.$ According to another aspect of the present disclosure, an image capturing apparatus includes the imaging lens assembly according to the aforementioned aspect and an image sensor, wherein the image sensor is disposed on the image surface of the imaging lens assembly.

According to another aspect of the present disclosure, an electronic device includes the image capturing apparatus according to the foregoing aspect.

DETAILED DESCRIPTION

Figure 1:
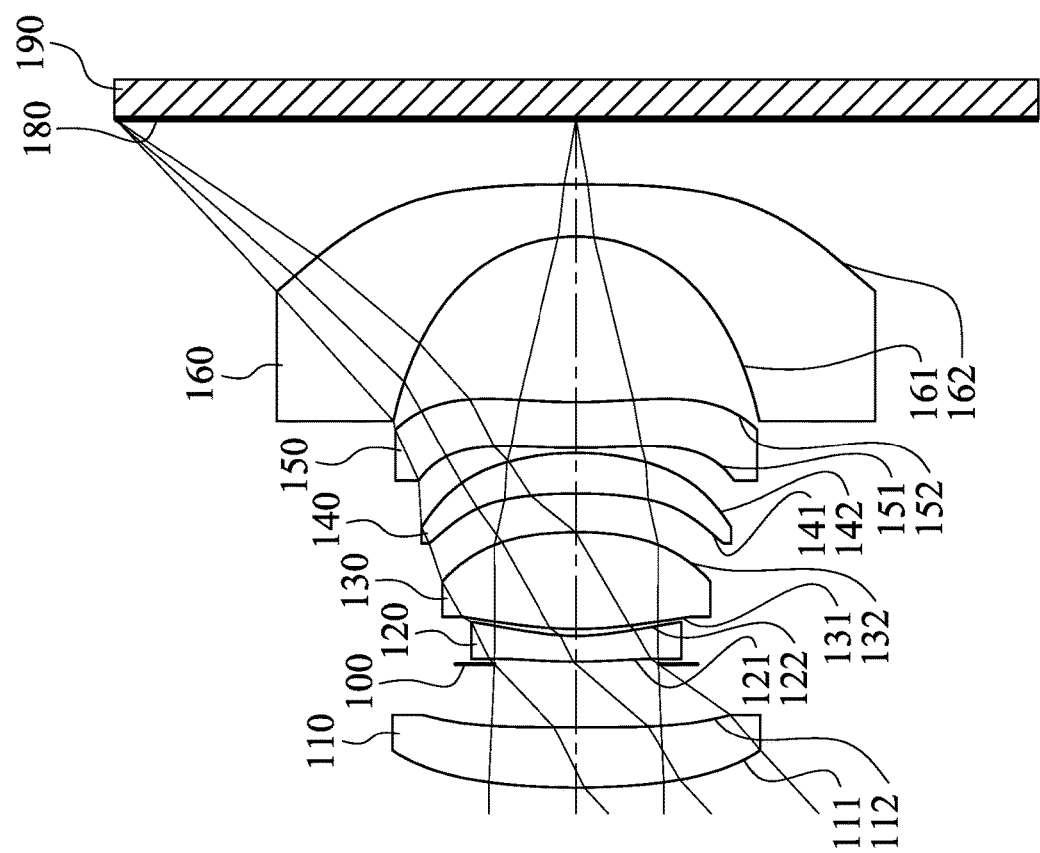
FIG. 1 is a schematic view of an image capturing apparatus according to the 1st embodiment of the present disclosure.

An imaging lens assembly includes, in order from an object side to an image side, a first lens element, a second lens element, a third lens element, a fourth lens element, a fifth lens element and a sixth lens element. The imaging lens assembly has a total of six lens elements. The imaging lens assembly can further include an aperture stop disposed between an imaged object and the third lens element.

According to the imaging lens assembly of the present disclosure, there is an air gap between every two of the first lens element, the second lens element, the third lens element, the fourth lens element, the fifth lens element and the sixth lens element that are adjacent to each other, that is, each of the first through sixth lens elements of the imaging lens assembly is a single and non-cemented lens element. Moreover, the manufacturing process of the cemented lenses is more complex than the non-cemented lenses. In particular, cemented surfaces of lens elements need to have accurate curvature to ensure two lens elements will be highly cemented. However, during the cementing process, those two lens elements might not be highly cemented due to displacement and it is thereby not favorable for the image quality of the imaging lens assembly. Therefore, there is an air gap between every two of the first lens element, the second lens element, the third lens element, the fourth lens element, the fifth lens element and the sixth lens element that are adjacent to each other in the present disclosure for avoiding the problem generated by the cemented lens elements.

The first lens element can have positive refractive power. Therefore, it is favorable for reducing the total track length of the imaging lens assembly.

The second lens element can have negative refractive power. Therefore, it is favorable for effectively correcting aberrations of the imaging lens assembly.

The third lens element can have positive refractive power. Therefore, it is favorable for the light of large field of view gradually converging to the image surface, thus preventing insufficient relative illumination resulted from positive refractive power being too close to the imaged object, and avoiding excessive or insufficient aberration corrections resulted from positive refractive power being too close to the image surface.

The sixth lens element can have negative refractive power, and can have an object-side surface being concave in a paraxial region thereof and an image-side surface being concave in a paraxial region thereof. Therefore, it is favorable for the exit pupil position being closer to the image surface so as to increase the chief ray angle, reduce the back focal length and maintain the compact size of the imaging lens assembly. Furthermore, the image-side surface of the sixth lens element can include at least one convex shape in an off-axial region thereof. Therefore, it is favorable for correcting off-axial aberrations.

At least one surface of at least one lens element of the first lens element, the second lens element, the third lens element, the fourth lens element, the fifth lens element and the sixth lens element can include at least one critical point. Therefore, it is favorable for correcting aberrations of the paraxial regions and the off-axial regions.

When an incident angle of a chief ray at a maximum image height on an image surface of the imaging lens assembly is CRA1.0Y, the following condition is satisfied:

38.0 degrees≤CRA1.0Y. Therefore, it is favorable for allocating both the exit pupil and the principal point closer to the image surface so as to effectively reduce the back focal length and maintain the compact size of the imaging lens assembly. Furthermore, it is favorable for obtaining a better chief ray angle so as to maintain the compact size and excellent image quality simultaneously. Preferably, the following condition is satisfied: 45.0 degrees<CRA1.0Y, or 40.0 degrees<CRA1.0Y<62.5 degrees. More preferably, the following condition is satisfied: 50.0 degrees<CRA1.0Y<60.0 degrees. When a focal length of the first lens element is f1, a focal length of the second lens element is f2, a focal length of the third lens element is f3, a focal length of the fourth lens element is f4, a focal length of the fifth lens element is f5, and a focal length of the sixth lens element is f6, the following conditions are satisfied: |f6|<|f3|<|f1|; |f6|<|f3|<|f2|; |f6|<|f3|<|f4|; and |f6|<|f3|<|f5|. Therefore, it is favorable for the light of large field of view gradually converging to the image surface, thus preventing insufficient relative illumination resulted from positive refractive power being too close to the imaged object, and avoiding excessive or insufficient aberration corrections resulted from positive refractive power being too close to the image surface. Furthermore, it is favorable for allocating the exit pupil closer to the image surface so as to increase the chief ray angle, reduce the back focal length and maintain the compact size of the imaging lens assembly.

When an axial distance between the fourth lens element and the fifth lens element is T45, and an axial distance between the fifth lens element and the sixth lens element is T56, the following condition is satisfied: 0.70<T56/T45. Therefore, it is favorable for obtaining a larger air gap between the fifth lens element and the sixth lens element so as to achieve a suitable manufacturing configuration, while reducing manufacturing problems from the thin structure in the paraxial region and thick structure in the off-axial region of the sixth lens element with high refractive power. Preferably, the following condition is satisfied: 1.25<T56/T45<125.

When the incident angle of the chief ray at the maximum image height on the image surface of the imaging lens assembly is CRA1.0Y, an axial distance between an object-side surface of the first lens element and the image surface is TL, and the maximum image height of the imaging lens assembly is ImgH, the following condition is satisfied: 0<TL/(tan(CRA1.0Y)×ImgH)<2.0. Therefore, it is favorable for maintaining the compact size of the imaging lens assembly.

When an entrance pupil diameter of the imaging lens assembly is EPD, and an axial distance between the image-side surface of the sixth lens element and the image surface is BL, the following condition is satisfied: 1.25<EPD/BL. Therefore, it is favorable for obtaining a shorter back focal length under the configuration with large aperture so as to further achieve the compact size of the imaging lens assembly. Preferably, the following condition is satisfied: 1.25<EPD/BL<5.0. More preferably, the following condition is satisfied: 1.75<EPD/BL<4.0.

When an Abbe number of the first lens element is V1, an Abbe number of the second lens element is V2, an Abbe number of the third lens element is V3, an Abbe number of the fourth lens element is V4, an Abbe number of the fifth lens element is V5, and an Abbe number of the sixth lens element is V6, at least three of V1, V2, V3, V4, V5 and V6 are greater than 50. Therefore, it is favorable for a balanced correction of astigmatism and chromatic aberration.

When an f-number of the imaging lens assembly is Fno, the following condition is satisfied: 1.0<Fno<4.0. Therefore, it is favorable for having sufficient illumination of the off-axial regions to reduce vignetting effects.

When a maximum value among maximum effective radii of object-side surfaces and image-side surfaces of the first lens element, the second lens element, the third lens element, the fourth lens element, the fifth lens element and the sixth lens element is SDmax, and a minimum value among maximum effective radii of object-side surfaces and image-side surfaces of the first lens element, the second lens element, the third lens element, the fourth lens element, the fifth lens element and the sixth lens element is SDmin, the following condition is satisfied: 2.75<SDmax/SDmin<6.0. Therefore, it is favorable for the light converging to the image surface in a shorter distance so as to further reduce the size of the imaging lens assembly.

When half of a maximal field of view of the imaging lens assembly is HFOV, and the incident angle of the chief ray at the maximum image height on the image surface of the imaging lens assembly is CRA1.0Y, the following condition is satisfied: 0<HFOV/CRA1.0Y<1.0. Therefore, it is favorable for balancing the field of view and the chief ray angle to obtain a configuration suitable for a compact imaging lens assembly.

When an axial distance between the aperture stop and the image-side surface of the sixth lens element is SD, and the maximum image height of the imaging lens assembly is ImgH, the following condition is satisfied: 0.80<SD/ImgH<1.50. Therefore, it is favorable for preventing the aperture stop from being too close to the image surface with insufficient relative illumination due to excessively narrow cone of light, or being too far from the image surface with difficulties of achieving compact size.

When a displacement in parallel with an optical axis from an axial vertex on the image-side surface of the sixth lens element to a maximum effective radius position on the image-side surface of the sixth lens element is SAG62, and a central thickness of the sixth lens element is CT6, the following condition is satisfied: −3.0<SAG62/CT6<−0.75. Therefore, it is favorable for avoiding the assembling difficulties of the imaging lens assembly resulted from the off-axial region of the sixth lens element being excessively close to the image surface.

When the axial distance between the fifth lens element and the sixth lens element is T56, a displacement in parallel with the optical axis from an axial vertex on the image-side surface of the fifth lens element to a maximum effective radius position on the image-side surface of the fifth lens element is SAG52, and a displacement in parallel with the optical axis from an axial vertex on the object-side surface of the sixth lens element to a maximum effective radius position on the object-side surface of the sixth lens element is SAG61, the following condition is satisfied: 3.0<T56/(T56−SAG52+SAG61)<100. Therefore, it is favorable for preventing the overall structure of the imaging lens assembly from being too complex resulted from an excessively large air gap in the off-axial region between the fifth lens element and the sixth lens element.

When a maximum effective radius of the image-side surface of the sixth lens element is SD62, and the entrance pupil diameter of the imaging lens assembly is EPD, the following condition is satisfied: 1.65≤SD62/EPD<5.0. Therefore, it is favorable for ensuring a large enough surface of the lens element closest to the image surface so as to easily control the chief ray angle in the off-axial region of the image surface.

When a curvature radius of the object-side surface of the sixth lens element is R11, and a curvature radius of the image-side surface of the sixth lens element is R12, the following condition is satisfied: (R11+R12)/(R11−R12)<−0.50. Therefore, it is favorable for a flatter image-side surface of the sixth lens element so as to avoid the image-side surface of the sixth lens element being excessively close to the image surface.

According to the imaging lens assembly of the present disclosure, the lens elements thereof can be made of plastic or glass materials. When the lens elements are made of plastic materials, the manufacturing cost can be effectively reduced. When the lens elements are made of glass materials, the arrangement of the refractive power of the imaging lens assembly may be more flexible to design. Furthermore, surfaces of each lens element can be arranged to be aspheric, since the aspheric surface of the lens element is easy to form a shape other than spherical surface so as to have more controllable variables for eliminating aberrations thereof, and to further decrease the required number of the lens elements. Therefore, the total track length of the imaging lens assembly can also be reduced.

According to the imaging lens assembly of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. According to the imaging lens assembly of the present disclosure, the refractive power or the focal length of a lens element being positive or negative may refer to the refractive power or the focal length in a paraxial region of the lens element.

According to the imaging lens assembly of the present disclosure, a critical point is a non-axial point of the lens surface where its tangent is perpendicular to the optical axis.

According to the imaging lens assembly of the present disclosure, the imaging lens assembly can include at least one stop, such as an aperture stop, a glare stop or a field stop. The glare stop or the field stop is for eliminating the stray light and thereby improving the image resolution thereof.

According to the imaging lens assembly of the present disclosure, the image surface, depending on the corresponding image sensor, can be a planar surface or a curved surface with any curvature, particularly a curved surface being concave toward the object side.

According to the imaging lens assembly of the present disclosure, an aperture stop can be configured as a front stop or a middle stop. A front stop disposed between an imaged object and the first lens element can provide a longer distance between an exit pupil of the imaging lens assembly and the image surface to enable a telecentric effect, and thereby can improve the image-sensing efficiency of an image sensor. A middle stop disposed between the first lens element and the image surface is favorable for enlarging the field of view of the imaging lens assembly and thereby provides a wider field of view for the same.

According to the imaging lens assembly of the present disclosure, the imaging lens assembly can be optionally applied to moving focus optical systems. Furthermore, the imaging lens assembly is featured with good correction ability and high image quality, and can be applied to 3D (three-dimensional) image capturing applications, in products such as digital cameras, mobile devices, digital tablets, smart TVs, network monitoring devices, motion sensing input devices, driving recorders, rear view camera systems, robots, wearable devices and other electronic imaging products.

According to the present disclosure, an image capturing apparatus is provided. The image capturing apparatus includes the aforementioned imaging lens assembly according to the present disclosure and an image sensor, wherein the image sensor is disposed on or near the image surface of the aforementioned imaging lens assembly. Therefore, it is favorable for the light of large field of view gradually converging to the image surface by the third lens element with positive refractive power, so that the insufficient relative illumination resulted from positive refractive power excessively close to the imaged object could be prevented, and excessive or insufficient aberration corrections resulted from positive refractive power excessively close to the image surface could be avoided. Furthermore, it is favorable for allocating the exit pupil closer to the image surface with the sixth lens element being closest to the image surface having negative refractive power, so as to increase the chief ray angle, reduce the back focal length and maintain the compact size of the image capturing apparatus. Preferably, the image capturing apparatus can further include a barrel member, a holder member or a combination thereof.

According to the present disclosure, an electronic device is provided, wherein the electronic device includes the aforementioned image capturing apparatus. Therefore, it is favorable for simultaneously satisfying the requirement of compact size and enhancing the image quality. Preferably, the electronic device can further include but not limited to a control unit, a display, a storage unit, a random access memory unit (RAM) or a combination thereof.

According to the above description of the present disclosure, the following 1st-10th specific embodiments are provided for further explanation.

<1st Embodiment>

Figure 2:
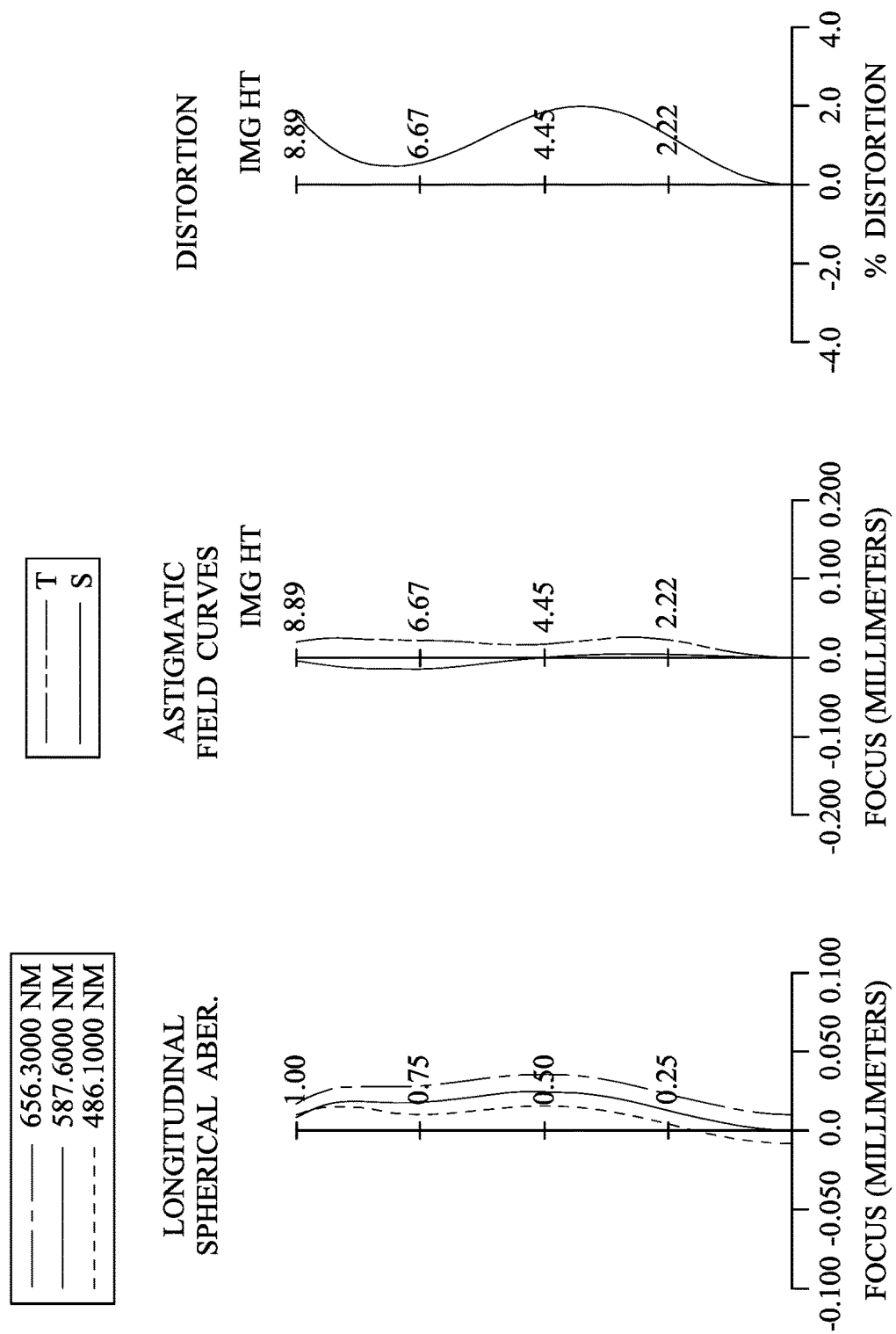
FIG. 2 shows spherical aberration curves, astigmatic field curves and a distortion curve of the image capturing apparatus according to the 1st embodiment.

FIG. 1 is a schematic view of an image capturing apparatus according to the 1st embodiment of the present disclosure. FIG. 2 shows, in order from left to right, spherical aberration curves, astigmatic field curves and a distortion curve of the image capturing apparatus according to the 1st embodiment. In FIG. 1, the image capturing apparatus includes the imaging lens assembly (its reference numeral is omitted) and an image sensor 190. The imaging lens assembly includes, in order from an object side to an image side, a first lens element 110, an aperture stop 100, a second lens element 120, a third lens element 130, a fourth lens element 140, a fifth lens element 150, a sixth lens element 160 and an image surface 180. The image sensor 190 is disposed on the image surface 180 of the imaging lens assembly. The imaging lens assembly has a total of six lens elements (110-160). Moreover, there is an air gap between every two of the first lens element 110, the second lens element 120, the third lens element 130, the fourth lens element 140, the fifth lens element 150 and the sixth lens element 160 that are adjacent to each other.

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of a plastic material, and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of a plastic material, and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of a plastic material, and has the object-side surface 151 and the image-side surface 152 being both aspheric.

The sixth lens element 160 with negative refractive power has an object-side surface 161 being concave in a paraxial region thereof and an image-side surface 162 being convex in a paraxial region thereof. The sixth lens element 160 is made of a plastic material, and has the object-side surface 161 and the image-side surface 162 being both aspheric.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the imaging lens assembly according to the 1st embodiment, when a focal length of the imaging lens assembly is f, an f-number of the imaging lens assembly is Fno, and half of a maximal field of view of the imaging lens assembly is HFOV, these parameters have the following values: f=9.44 mm; Fno=2.80; and HFOV=42.7 degrees.

Figure 15:
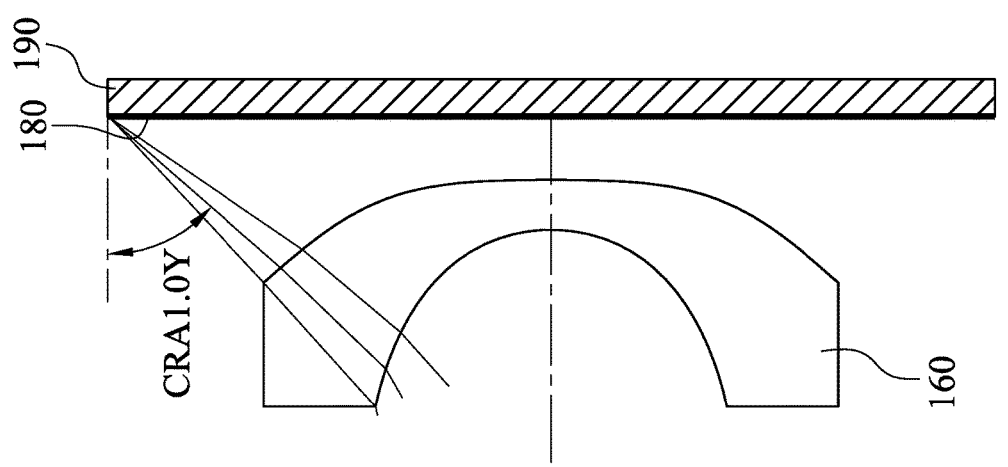
FIG. 15 shows a schematic view of the parameter CRA1.0Y of the imaging lens assembly of the image capturing apparatus according to FIG. 1.

FIG. 15 shows a schematic view of the parameter CRA1.0Y of the imaging lens assembly of the image capturing apparatus according to FIG. 1. In FIG. 15, when an incident angle of a chief ray at a maximum image height (a chief ray angle of the maximum image height) on the image surface 180 of the imaging lens assembly is CRA1.0Y, the following condition is satisfied: CRA1.0Y=48.9 degrees.

In the imaging lens assembly according to the 1st embodiment, when half of a maximal field of view of the imaging lens assembly is HFOV, and the incident angle of the chief ray at the maximum image height on the image surface 180 of the imaging lens assembly is CRA1.0Y, the following condition is satisfied: HFOV/CRA1.0Y=0.87.

In the imaging lens assembly according to the 1st embodiment, when an entrance pupil diameter of the imaging lens assembly is EPD, and an axial distance between the image-side surface 162 of the sixth lens element 160 and the image surface 180 is BL, the following condition is satisfied: EPD/BL=2.66.

In the imaging lens assembly according to the 1st embodiment, when an axial distance between the aperture stop 100 and the image-side surface 162 of the sixth lens element 160 is SD, and the maximum image height of the imaging lens assembly is ImgH (half of a diagonal length of an effective photosensitive area of the image sensor 190), the following condition is satisfied: SD/ImgH=1.04.

In the imaging lens assembly according to the 1st embodiment, when an axial distance between the fourth lens element 140 and the fifth lens element 150 is T45, and an axial distance between the fifth lens element 150 and the sixth lens element 160 is T56, the following condition is satisfied: T56/T45=31.87.

Figure 16:
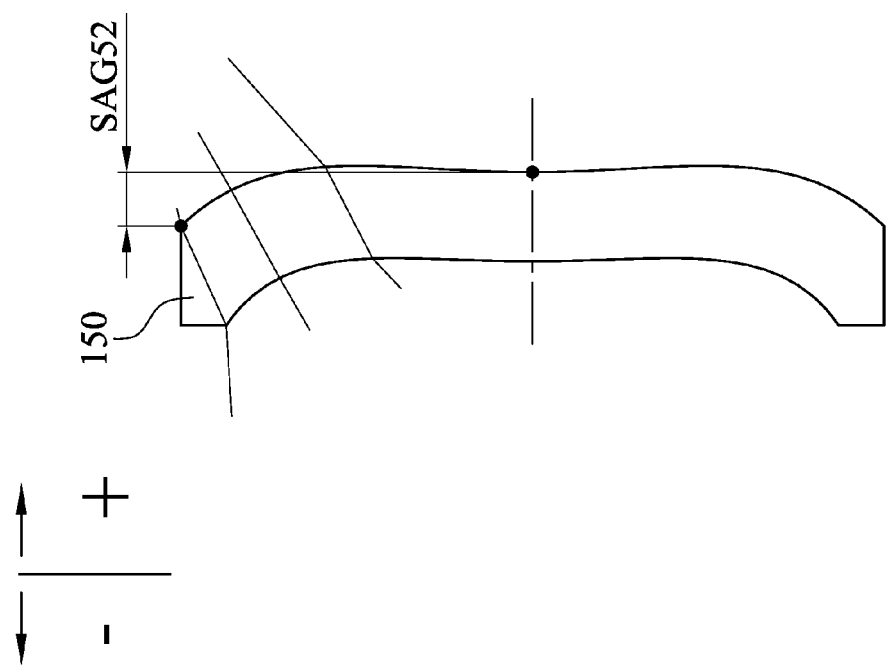
FIG. 16 shows a schematic view of the parameter SAG52 of the imaging lens assembly of the image capturing apparatus according to FIG. 1.
Figure 17:
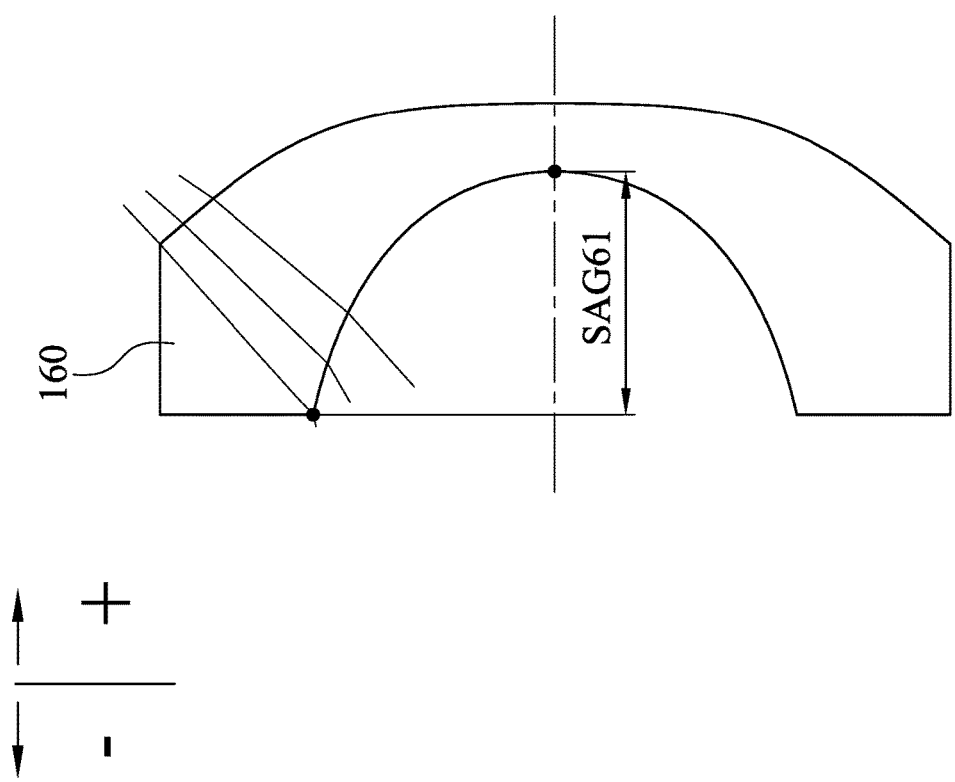
FIG. 17 shows a schematic view of the parameter SAG61 of the imaging lens assembly of the image capturing apparatus according to FIG. 1.

FIG. 16 shows a schematic view of the parameter SAG52 of the imaging lens assembly of the image capturing apparatus according to FIG. 1, and FIG. 17 shows a schematic view of the parameter SAG61 of the imaging lens assembly of the image capturing apparatus according to FIG. 1. In FIG. 16 and FIG. 17, when the axial distance between the fifth lens element 150 and the sixth lens element 160 is T56, a displacement in parallel with the optical axis from an axial vertex on the image-side surface 152 of the fifth lens element 150 to a maximum effective radius position on the image-side surface 152 of the fifth lens element 150 is SAG52 (SAG52 is a negative value with the displacement in parallel with the optical axis towards the object side; SAG52 is a positive value with the displacement in parallel with the optical axis towards the image side.), and a displacement in parallel with the optical axis from an axial vertex on the object-side surface 161 of the sixth lens element 160 to a maximum effective radius position on the object-side surface 161 of the sixth lens element 160 is SAG61 (SAG61 is a negative value with the displacement in parallel with the optical axis towards the object side; SAG61 is a positive value with the displacement in parallel with the optical axis towards the image side.), the following condition is satisfied: T56/(T56−SAG52+SAG61)=18.68.

In the imaging lens assembly according to the 1st embodiment, when the incident angle of the chief ray at the maximum image height on the image surface 180 of the imaging lens assembly is CRA1.0Y, an axial distance between the object-side surface 111 of the first lens element 110 and the image surface 180 is TL, and the maximum image height of the imaging lens assembly is ImgH, the following condition is satisfied: TL/(tan(CRA1.0Y)×ImgH)=1.27.

Figure 18:
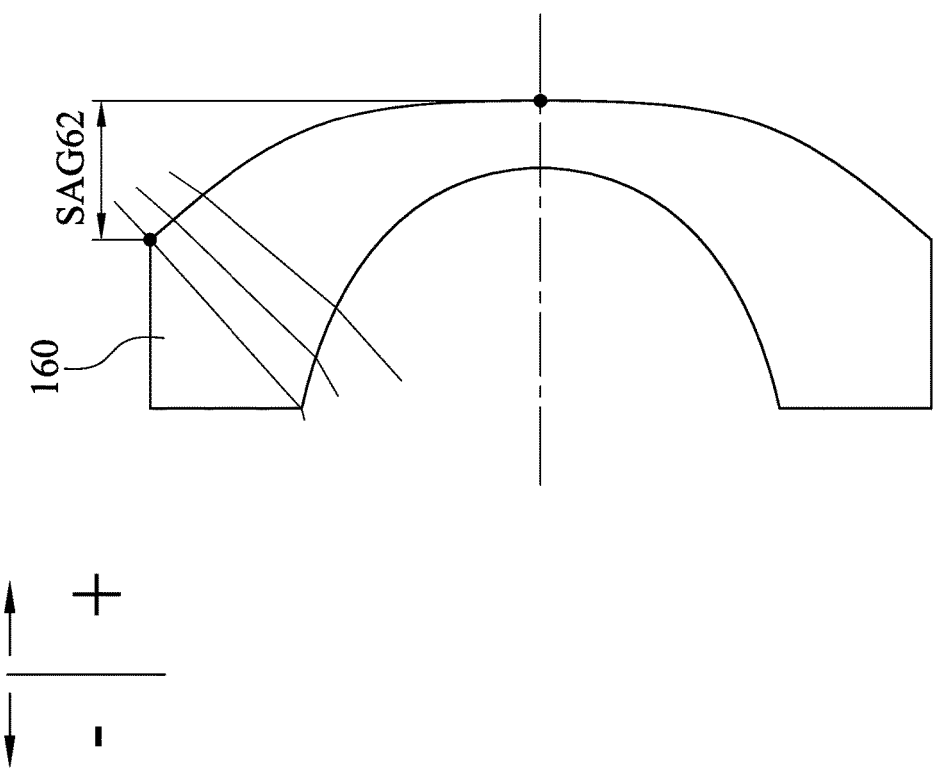
FIG. 18 shows a schematic view of the parameter SAG62 of the imaging lens assembly of the image capturing apparatus according to FIG. 1.

FIG. 18 shows a schematic view of the parameter SAG62 of the imaging lens assembly of the image capturing apparatus according to FIG. 1. In FIG. 18, when a displacement in parallel with the optical axis from an axial vertex on the image-side surface 162 of the sixth lens element 160 to a maximum effective radius position on the image-side surface 162 of the sixth lens element 160 is SAG62 (SAG62 is a negative value with the displacement in parallel with the optical axis towards the object side; SAG62 is a positive value with the displacement in parallel with the optical axis towards the image side.), and a central thickness of the sixth lens element 160 is CT6, the following condition is satisfied: SAG62/CT6=−2.06.

In the imaging lens assembly according to the 1st embodiment, when a maximum value among maximum effective radii of the object-side surfaces and the image-side surfaces of the first lens element 110, the second lens element 120, the third lens element 130, the fourth lens element 140, the fifth lens element 150 and the sixth lens element 160 is SDmax (It is the maximum effective radius of the image-side surface 162 of the sixth lens element 160 according to the 1st embodiment.), and a minimum value among maximum effective radii of the object-side surfaces and the image-side surfaces of the first lens element 110, the second lens element 120, the third lens element 130, the fourth lens element 140, the fifth lens element 150 and the sixth lens element 160 is SDmin (It is the maximum effective radius of the object-side surface 121 of the second lens element 120 according to the 1st embodiment.), the following condition is satisfied: SDmax/SDmin=3.43.

Figure 19:
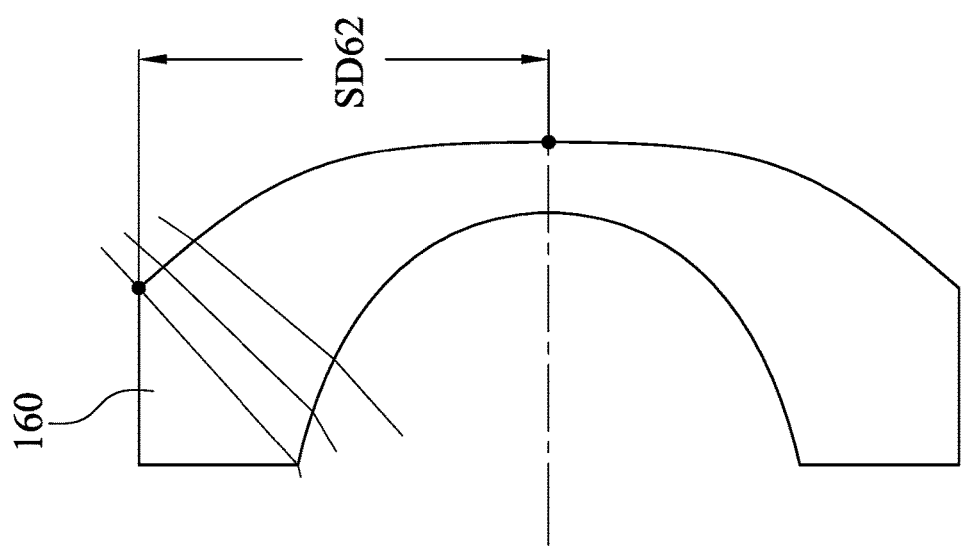
FIG. 19 shows a schematic view of the parameter SD62 of the imaging lens assembly of the image capturing apparatus according to FIG. 1.

FIG. 19 shows a schematic view of the parameter SD62 of the imaging lens assembly of the image capturing apparatus according to FIG. 1. In FIG. 19, when the maximum effective radius of the image-side surface 162 of the sixth lens element 160 is SD62, and the entrance pupil diameter of the imaging lens assembly is EPD, the following condition is satisfied: SD62/EPD=1.71.

In the imaging lens assembly according to the 1st embodiment, when a curvature radius of the object-side surface 161 of the sixth lens element 160 is R11, and a curvature radius of the image-side surface 162 of the sixth lens element 160 is R12, the following condition is satisfied: (R11+R12)/(R11−R12)=−1.15.

In the imaging lens assembly according to the 1st embodiment, when a focal length of the first lens element 110 is f1, a focal length of the second lens element 120 is f2, a focal length of the third lens element 130 is f3, a focal length of the fourth lens element 140 is f4, a focal length of the fifth lens element 150 is f5, and a focal length of the sixth lens element 160 is f6, the following conditions are satisfied: |f6|<|f3|<|f1|; |f6|<|f3|<|f2|; |f6|<|f3|<|f4|; and |f6|<|f3|<|f5|.

In the imaging lens assembly according to the 1st embodiment, when an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, and an Abbe number of the sixth lens element 160 is V6, there are five values (V1, V3, V4, V5 and V6) are greater than 50.

The detailed optical data of the 1st embodiment are shown in TABLE 1 and the aspheric surface data are shown in TABLE 2 below.

TABLE 1

1st Embodiment
f = 9.44 mm, Fno = 2.80, HFOV = 42.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 13.683 ASP | 1.171 | Plastic | 1.544 | 55.9 | 30.48 |
| 2 | | 76.158 ASP | 1.218 | | | | |
| 3 | Ape. Stop | Plano | 0.046 | | | | |
| 4 | Lens 2 | 9.578 ASP | 0.500 | Plastic | 1.660 | 20.4 | −14.86 |
| 5 | | 4.746 ASP | 0.132 | | | | |
| 6 | Lens 3 | 7.526 ASP | 1.860 | Plastic | 1.544 | 55.9 | 7.03 |
| 7 | | −7.094 ASP | 0.742 | | | | |
| 8 | Lens 4 | −10.801 ASP | 0.784 | Plastic | 1.544 | 55.9 | 18.00 |
| 9 | | −5.265 ASP | 0.100 | | | | |
| 10 | Lens 5 | 13.959 ASP | 0.885 | Plastic | 1.544 | 55.9 | −102.59 |
| 11 | | 10.916 ASP | 3.187 | | | | |
| 12 | Lens 6 | −3.274 ASP | 1.000 | Plastic | 1.544 | 55.9 | −6.52 |
| 13 | | −47.649 ASP | 1.269 | | | | |
| 14 | Image | Plano | — | | | | |

Reference wavelength is 587.6 nm (d-line).

TABLE 2

Aspheric Coefficients

| | Surface # | | | | | |
|---|---|---|---|---|---|---|
| | 1 | 2 | 4 | 5 | 6 | 7 |
| k = | −3.1183E+00 | 1.0000E+00 | 1.1342E+01 | −1.0601E+01 | −2.8114E+01 | −5.5762E+00 |
| A4 = | 2.8409E−04 | 1.3347E−03 | −1.4997E−02 | −5.0031E−03 | 1.5370E−03 | −1.1534E−02 |
| A6 = | 1.0221E−04 | 1.6206E−04 | 1.3769E−03 | 9.2176E−04 | −2.3067E−04 | −2.7081E−04 |
| A8 = | 2.1709E−06 | 4.6949E−06 | −4.3312E−04 | −2.1303E−04 | 1.0385E−05 | 3.9516E−05 |
| A10 = | −6.5548E−08 | −1.0569E−06 | 2.7077E−05 | 1.6952E−05 | −4.0049E−06 | −1.6379E−06 |

| | Surface # | | | | | |
|---|---|---|---|---|---|---|
| | 8 | 9 | 10 | 11 | 12 | 13 |
| k = | 1.0565E+01 | −5.0320E−01 | −5.0000E+01 | −1.0000E+00 | −2.0330E−01 | −1.0000E+00 |
| A4 = | −3.8076E−03 | −1.0490E−03 | −9.0860E−03 | −9.6714E−03 | −2.6125E−03 | −2.4677E−03 |

TABLE 2-continued

Aspheric Coefficients

| A6 = | −1.2601E−03 | −5.0131E−04 | 5.6779E−04 | 6.0596E−04 | −1.5010E−04 | 1.7995E−05 |
|---|---|---|---|---|---|---|
| A8 = | 2.7059E−05 | −6.4830E−05 | −8.0804E−05 | −5.1502E−05 | 1.0041E−05 | 2.8982E−07 |
| A10 = | 1.0089E−05 | 5.0832E−06 | 6.1040E−07 | 1.3937E−06 | −4.8221E−07 | −1.6015E−11 |

In TABLE 1, the curvature radius, the thickness and the focal length are shown in millimeters (mm). Surface numbers 0-14 represent the surfaces sequentially arranged from the object-side to the image-side along the optical axis. In TABLE 2, k represents the conic coefficient of the equation of the aspheric surface profiles. A4-A10 represent the aspheric coefficients ranging from the 4th order to the 10th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

<2nd Embodiment>

Figure 3:
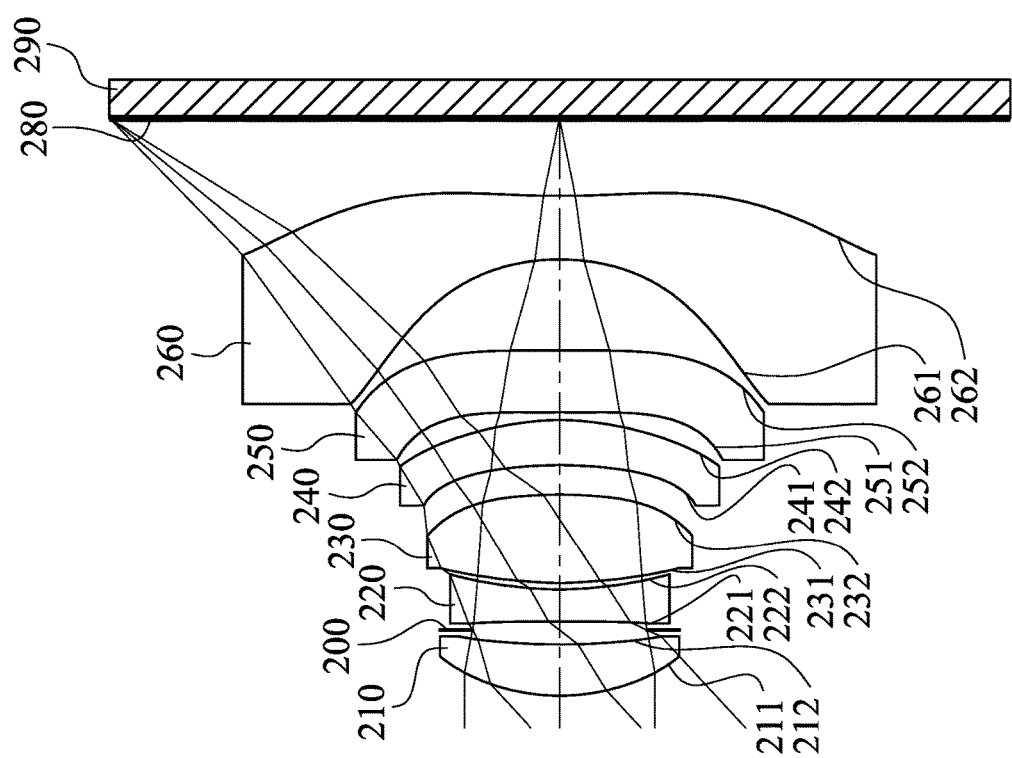
FIG. 3 is a schematic view of an image capturing apparatus according to the 2nd embodiment of the present disclosure.
Figure 4:
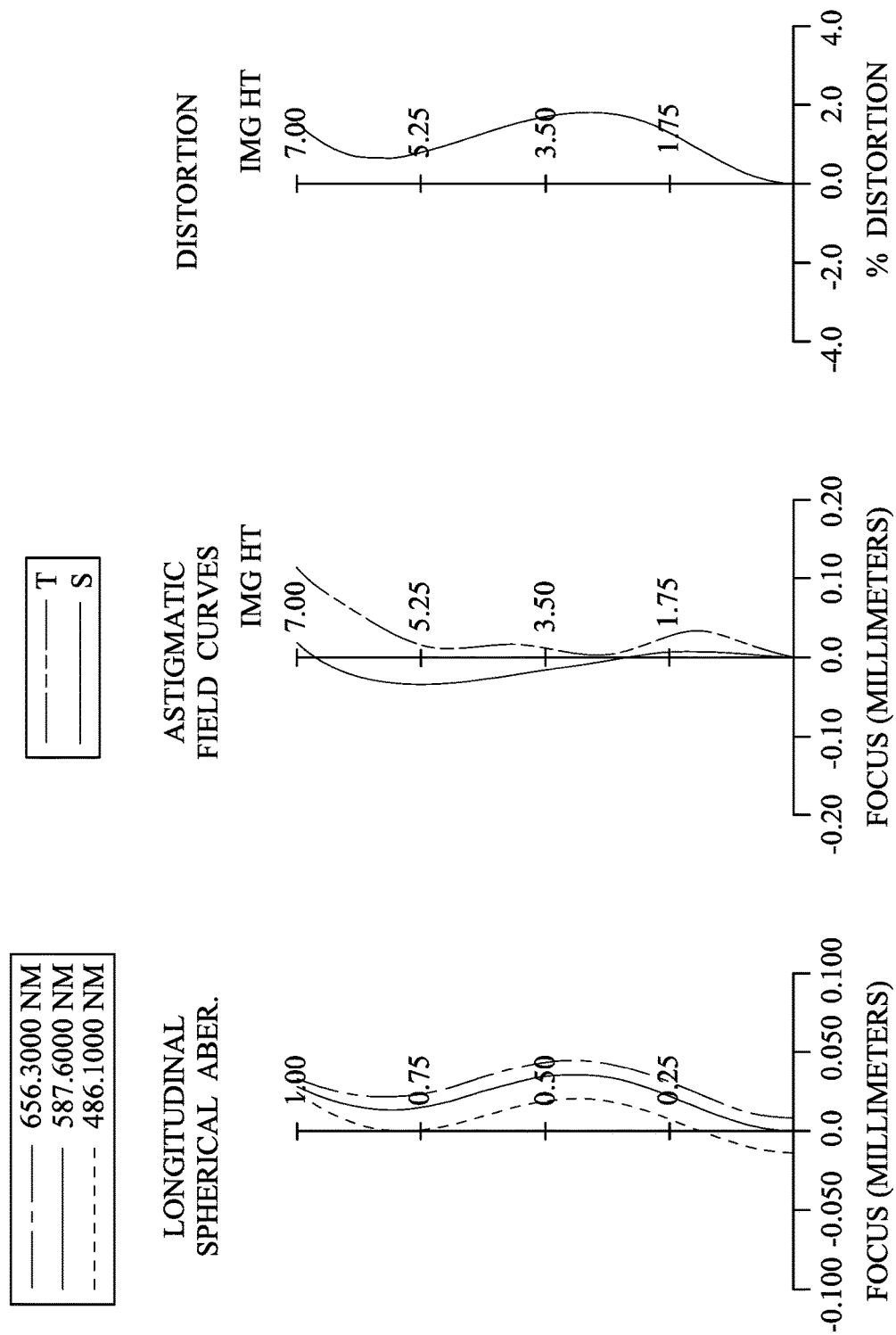
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows, in order from left to right, spherical aberration curves, astigmatic field curves and a distortion curve of the image capturing apparatus according to the 2nd embodiment. In FIG. 3, the image capturing apparatus includes the imaging lens assembly (its reference numeral is omitted) and an image sensor 290. The imaging lens assembly includes, in order from an object side to an image side, a first lens element 210, an aperture stop 200, a second lens element 220, a third lens element 230, a fourth lens element 240, a fifth lens element 250, a sixth lens element 260 and an image surface 280. The image sensor 290 is disposed on the image surface 280 of the imaging lens assembly. The imaging lens assembly has a total of six lens elements (210-260). Moreover, there is an air gap between every two of the first lens element 210, the second lens element 220, the third lens element 230, the fourth lens element 240, the fifth lens element 250 and the sixth lens element 260 that are adjacent to each other.

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with negative refractive power has an object-side surface 221 being planar in a paraxial region thereof and an image-side surface 222 being concave in a paraxial region thereof. The second lens element 220 is made of a plastic material, and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of a plastic material, and has the object-side surface 231 and the image-side surface 232 being both aspheric.

The fourth lens element 240 with positive refractive power has an object-side surface 241 being concave in a paraxial region thereof and an image-side surface 242 being convex in a paraxial region thereof. The fourth lens element 240 is made of a plastic material, and has the object-side surface 241 and the image-side surface 242 being both aspheric.

The fifth lens element 250 with positive refractive power has an object-side surface 251 being convex in a paraxial region thereof and an image-side surface 252 being convex in a paraxial region thereof. The fifth lens element 250 is made of a plastic material, and has the object-side surface 251 and the image-side surface 252 being both aspheric.

The sixth lens element 260 with negative refractive power has an object-side surface 261 being concave in a paraxial region thereof and an image-side surface 262 being concave in a paraxial region thereof. The sixth lens element 260 is made of a plastic material, and has the object-side surface 261 and the image-side surface 262 being both aspheric. Furthermore, the image-side surface 262 of the sixth lens element 260 includes at least one convex shape in an off-axial region thereof.

The detailed optical data of the 2nd embodiment are shown in TABLE 3 and the aspheric surface data are shown in TABLE 4 below.

TABLE 3

2nd Embodiment
f = 7.42 mm, Fno = 2.50, HFOV = 42.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 3.300 ASP | 0.799 | Plastic | 1.535 | 55.7 | 8.52 |
| 2 | | 10.958 ASP | 0.224 | | | | |
| 3 | Ape. Stop | Plano | 0.132 | | | | |
| 4 | Lens 2 | ∞ ASP | 0.500 | Plastic | 1.614 | 25.6 | −8.62 |
| 5 | | 5.297 ASP | 0.100 | | | | |
| 6 | Lens 3 | 5.659 ASP | 1.384 | Plastic | 1.544 | 55.9 | 6.28 |
| 7 | | −7.882 ASP | 0.461 | | | | |
| 8 | Lens 4 | −6.180 ASP | 0.700 | Plastic | 1.544 | 55.9 | 19.79 |
| 9 | | −4.083 ASP | 0.122 | | | | |
| 10 | Lens 5 | 177.998 ASP | 0.960 | Plastic | 1.614 | 25.6 | 248.88 |
| 11 | | −1080.635 ASP | 1.417 | | | | |

TABLE 3-continued

2nd Embodiment
f = 7.42 mm, Fno = 2.50, HFOV = 42.8 deg.

| Surface # | | Curvature Radius | | Thickness | Material | Index | Abbe # | Focal Length |
|---|---|---|---|---|---|---|---|---|
| 12 | Lens 6 | −3.534 | ASP | 1.000 | Plastic | 1.544 | 55.9 | −5.11 |
| 13 | | 14.284 | ASP | 1.206 | | | | |
| 14 | Image | Plano | | — | | | | |

Reference wavelength is 587.6 nm (d-line).

TABLE 4

Aspheric Coefficients

| | Surface # | | | | | |
|---|---|---|---|---|---|---|
| | 1 | 2 | 4 | 5 | 6 | 7 |
| k = | −9.4786E−01 | 1.0000E+00 | −1.0000E+00 | −1.7964E+01 | −3.5940E+01 | −3.5869E+00 |
| A4 = | 2.9056E−03 | −1.3968E−03 | −1.3448E−02 | −9.7536E−03 | 1.0532E−03 | −9.6388E−03 |
| A6 = | 5.0233E−04 | 3.5903E−05 | 5.8741E−03 | 9.7300E−03 | −2.6107E−04 | −3.0651E−03 |
| A8 = | −6.9511E−05 | 9.2742E−04 | −1.2047E−03 | −2.1961E−03 | 4.6159E−04 | −7.3642E−05 |
| A10 = | 8.1997E−05 | −2.1471E−04 | −1.7962E−04 | 1.4001E−04 | −5.3815E−05 | 4.0617E−05 |

| | Surface # | | | | | |
|---|---|---|---|---|---|---|
| | 8 | 9 | 10 | 11 | 12 | 13 |
| k = | 7.2749E+00 | −1.2124E+01 | −5.0000E+01 | −1.0000E+00 | −1.0562E+00 | −1.0000E+00 |
| A4 = | 1.3827E−02 | −6.9523E−03 | −9.1443E−03 | −6.8927E−03 | −1.1636E−02 | −8.0539E−03 |
| A6 = | −4.9612E−03 | 1.8979E−04 | −2.3912E−03 | −4.4679E−04 | 3.8062E−06 | 3.8386E−04 |
| A8 = | 2.8827E−04 | 7.2456E−05 | 5.4658E−04 | 5.6184E−05 | 1.5243E−05 | −1.0955E−05 |
| A10 = | 2.2659E−05 | −1.5842E−05 | −6.1468E−05 | −3.6568E−06 | 2.5144E−06 | 1.5258E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f (mm) | 7.42 | T56/T45 | 11.61 |
| Fno | 2.50 | T56/(T56 − SAG52 + SAG61) | 11.04 |
| HFOV (deg.) | 42.8 | TL/(tan(CRA1.0Y) × ImgH) | 1.05 |
| CRA1.0Y (deg.) | 50.8 | SAG62/CT6 | −0.92 |
| HFOV/CRA1.0Y | 0.84 | SDmax/SDmin | 3.47 |
| EPD/BL | 2.46 | SD62/EPD | 1.66 |
| SD/ImgH | 0.97 | (R11 + R12)/(R11 − R12) | −0.60 |

Furthermore, in the imaging lens assembly according to the 2nd embodiment, when a focal length of the first lens element 210 is f1, a focal length of the second lens element 220 is f2, a focal length of the third lens element 230 is f3, a focal length of the fourth lens element 240 is f4, a focal length of the fifth lens element 250 is f5, and a focal length of the sixth lens element 260 is f6, the following conditions are satisfied: |f6|<|f3|<|f1|; |f6|<|f3|<|f2|; |f6|<|f3|<|f4|; and |f6|<|f3|<|f5|.

In the imaging lens assembly according to the 2nd embodiment, when an Abbe number of the first lens element 210 is V1, an Abbe number of the second lens element 220 is V2, an Abbe number of the third lens element 230 is V3, an Abbe number of the fourth lens element 240 is V4, an Abbe number of the fifth lens element 250 is V5, and an Abbe number of the sixth lens element 260 is V6, there are four values (V1, V3, V4 and V6) are greater than 50.

<3rd Embodiment>

Figure 5:
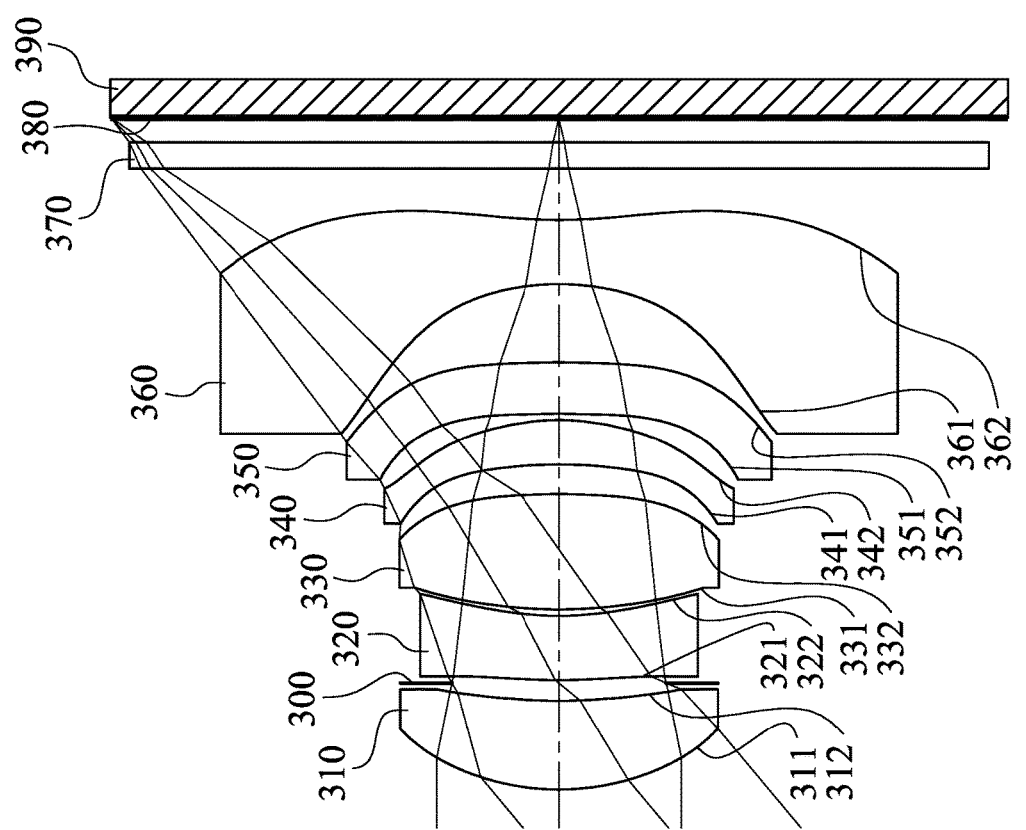
FIG. 5 is a schematic view of an image capturing apparatus according to the 3rd embodiment of the present disclosure.
Figure 6:
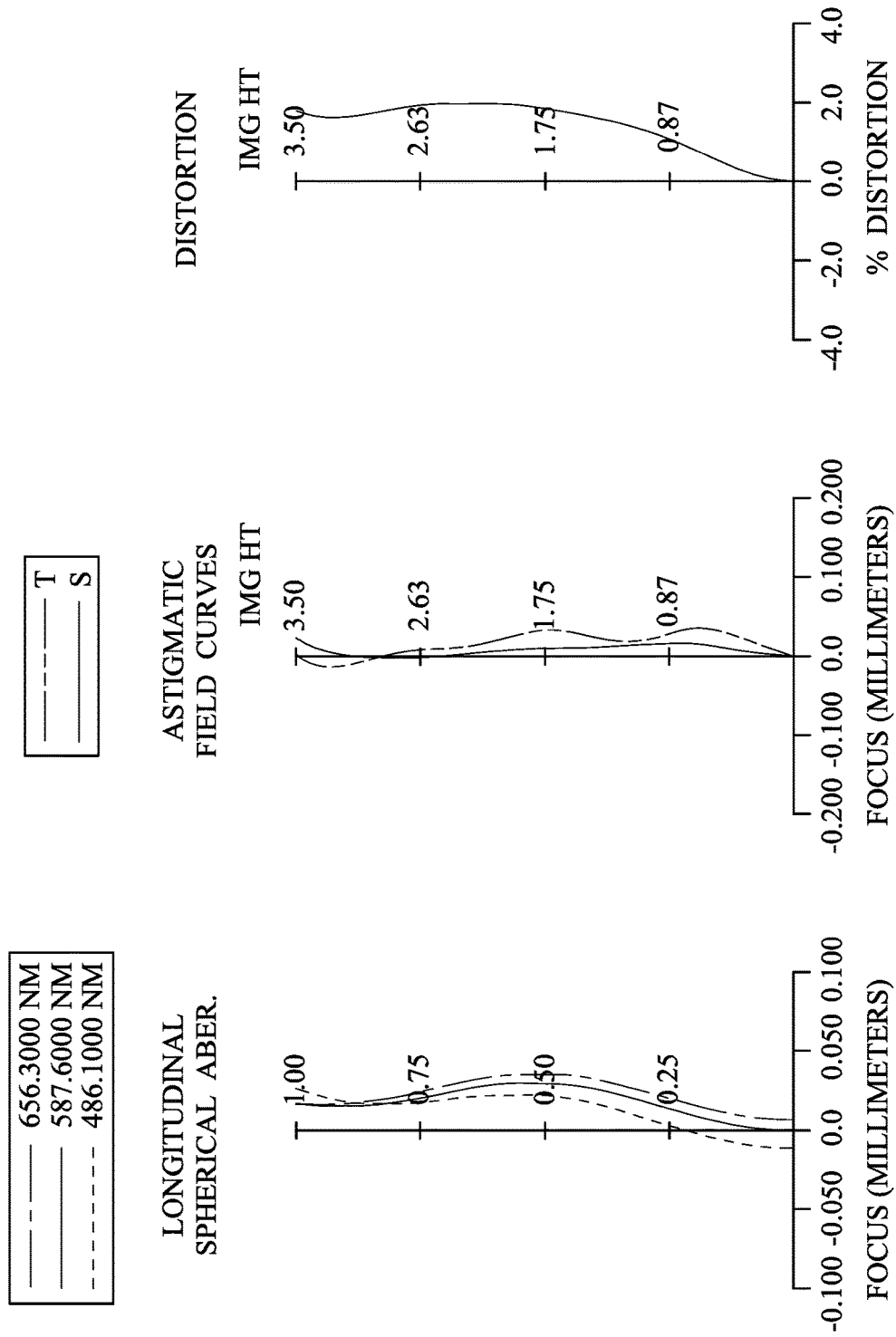
FIG. 6 shows spherical aberration curves, astigmatic field curves and a distortion curve of the image capturing apparatus according to the 3rd embodiment.

FIG. 5 is a schematic view of an image capturing apparatus according to the 3rd embodiment of the present disclosure. FIG. 6 shows, in order from left to right, spherical aberration curves, astigmatic field curves and a distortion curve of the image capturing apparatus according to the 3rd embodiment. In FIG. 5, the image capturing apparatus includes the imaging lens assembly (its reference numeral is omitted) and an image sensor 390. The imaging lens assembly includes, in order from an object side to an image side, a first lens element 310, an aperture stop 300, a second lens element 320, a third lens element 330, a fourth lens element 340, a fifth lens element 350, a sixth lens element 360, an IR-cut filter 370 and an image surface 380. The image sensor 390 is disposed on the image surface 380 of the imaging lens assembly. The imaging lens assembly has a total of six lens elements (310-360). Moreover, there is an air gap between every two of the first lens element 310, the second lens element 320, the third lens element 330, the fourth lens element 340, the fifth lens element 350 and the sixth lens element 360 that are adjacent to each other.

The first lens element 310 with positive refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of a plastic material, and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of a plastic material, and has the object-side surface 341 and the image-side surface 342 being both aspheric.

The fifth lens element 350 with negative refractive power has an object-side surface 351 being concave in a paraxial region thereof and an image-side surface 352 being convex in a paraxial region thereof. The fifth lens element 350 is made of a plastic material, and has the object-side surface 351 and the image-side surface 352 being both aspheric.

The sixth lens element 360 with negative refractive power has an object-side surface 361 being concave in a paraxial region thereof and an image-side surface 362 being concave in a paraxial region thereof. The sixth lens element 360 is made of a plastic material, and has the object-side surface 361 and the image-side surface 362 being both aspheric. Furthermore, the image-side surface 362 of the sixth lens element 360 includes at least one convex shape in an off-axial region thereof.

The IR-cut filter 370 is made of a glass material and located between the sixth lens element 360 and the image surface 380, and will not affect the focal length of the imaging lens assembly.

The detailed optical data of the 3rd embodiment are shown in TABLE 5 and the aspheric surface data are shown in TABLE 6 below.

TABLE 5

3rd Embodiment
f = 4.10 mm, Fno = 2.15, HFOV = 39.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.985 ASP | 0.696 | Plastic | 1.544 | 55.9 | 5.97 |
| 2 | | 4.475 ASP | 0.139 | | | | |
| 3 | Ape. Stop | Plano | 0.023 | | | | |
| 4 | Lens 2 | 4.860 ASP | 0.500 | Plastic | 1.660 | 20.4 | −7.79 |
| 5 | | 2.396 ASP | 0.050 | | | | |
| 6 | Lens 3 | 3.484 ASP | 0.901 | Plastic | 1.544 | 55.9 | 4.00 |
| 7 | | −5.273 ASP | 0.230 | | | | |
| 8 | Lens 4 | −3.685 ASP | 0.350 | Plastic | 1.544 | 55.9 | 5.68 |
| 9 | | −1.737 ASP | 0.050 | | | | |
| 10 | Lens 5 | −6.989 ASP | 0.400 | Plastic | 1.660 | 20.4 | −103.45 |
| 11 | | −7.963 ASP | 0.610 | | | | |
| 12 | Lens 6 | −2.038 ASP | 0.500 | Plastic | 1.515 | 56.5 | −2.55 |
| 13 | | 4.007 ASP | 0.400 | | | | |
| 14 | IR-cut filter | Plano | 0.210 | Glass | 1.517 | 64.2 | — |
| 15 | | Plano | 0.190 | | | | |
| 16 | Image | Plano | — | | | | |

Reference wavelength is 587.6 nm (d-line).

TABLE 6

Aspheric Coefficients

| | Surface # | | | | | |
|---|---|---|---|---|---|---|
| | 1 | 2 | 4 | 5 | 6 | 7 |
| k = | −1.0392E+00 | 1.0000E+00 | −1.0000E+00 | −1.4749E+01 | −8.8156E+00 | −5.0000E+01 |
| A4 = | 1.1885E−02 | −4.6281E−02 | −1.1774E−01 | −1.7029E−03 | −4.0074E−02 | −6.4062E−02 |
| A6 = | 1.7472E−02 | 3.0284E−02 | 6.3394E−02 | 1.4660E−02 | 7.5755E−02 | −2.4487E−02 |
| A8 = | −1.1340E−02 | 1.5223E−02 | −2.2819E−02 | 7.6991E−03 | −3.1953E−02 | −1.6466E−03 |
| A10 = | 7.4403E−03 | −1.7886E−02 | −1.5274E−02 | −1.3526E−02 | 2.0128E−03 | −3.1038E−04 |

| | Surface # | | | | | |
|---|---|---|---|---|---|---|
| | 8 | 9 | 10 | 11 | 12 | 13 |
| k = | 7.3968E+00 | −1.0665E+01 | −1.9374E+01 | −1.0000E+00 | −5.7675E+00 | −1.0000E+00 |
| A4 = | 4.1069E−02 | −4.6600E−02 | 8.1009E−02 | 2.2999E−02 | −1.0843E−01 | −7.0481E−02 |
| A6 = | −4.6216E−02 | −7.0063E−02 | −2.7085E−01 | −9.3708E−02 | −8.1441E−03 | 1.4554E−02 |
| A8 = | −6.1057E−02 | 2.0231E−02 | 1.6322E−01 | 3.7317E−02 | 1.9511E−03 | −1.7534E−03 |
| A10 = | 3.2788E−02 | 5.5499E−03 | −3.7544E−02 | −5.1909E−03 | 1.2874E−03 | 8.2109E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from TABLE 5 and TABLE 6 as the following values and satisfy the following conditions:

| 3rd Embodiment | | | |
|---|---|---|---|
| f (mm) | 4.10 | T56/T45 | 12.20 |
| Fno | 2.15 | T56/(T56 − SAG52 + SAG61) | 8.76 |
| HFOV (deg.) | 39.8 | TL/(tan(CRA1.0Y) × ImgH) | 1.45 |
| CRA1.0Y (deg.) | 46.0 | SAG62/CT6 | −0.83 |
| HFOV/CRA1.0Y | 0.87 | SDmax/SDmin | 3.06 |
| EPD/BL | 2.38 | SD62/EPD | 1.39 |
| SD/ImgH | 1.03 | (R11 + R12)/(R11 − R12) | −0.33 |

Furthermore, in the imaging lens assembly according to the 3rd embodiment, when a focal length of the first lens element 310 is f1, a focal length of the second lens element 320 is f2, a focal length of the third lens element 330 is f3, a focal length of the fourth lens element 340 is f4, a focal length of the fifth lens element 350 is f5, and a focal length of the sixth lens element 360 is f6, the following conditions are satisfied: |f6|<|f3|<|f1|; |f6|<|f3|<|f2|; |f6|<|f3|<|f4|; and |f6|<|f3|<|f5|.

In the imaging lens assembly according to the 3rd embodiment, when an Abbe number of the first lens element 310 is V1, an Abbe number of the second lens element 320 is V2, an Abbe number of the third lens element 330 is V3, an Abbe number of the fourth lens element 340 is V4, an Abbe number of the fifth lens element 350 is V5, and an Abbe number of the sixth lens element 360 is V6, there are four values (V1, V3, V4 and V6) are greater than 50.

<4th Embodiment>

Figure 7:
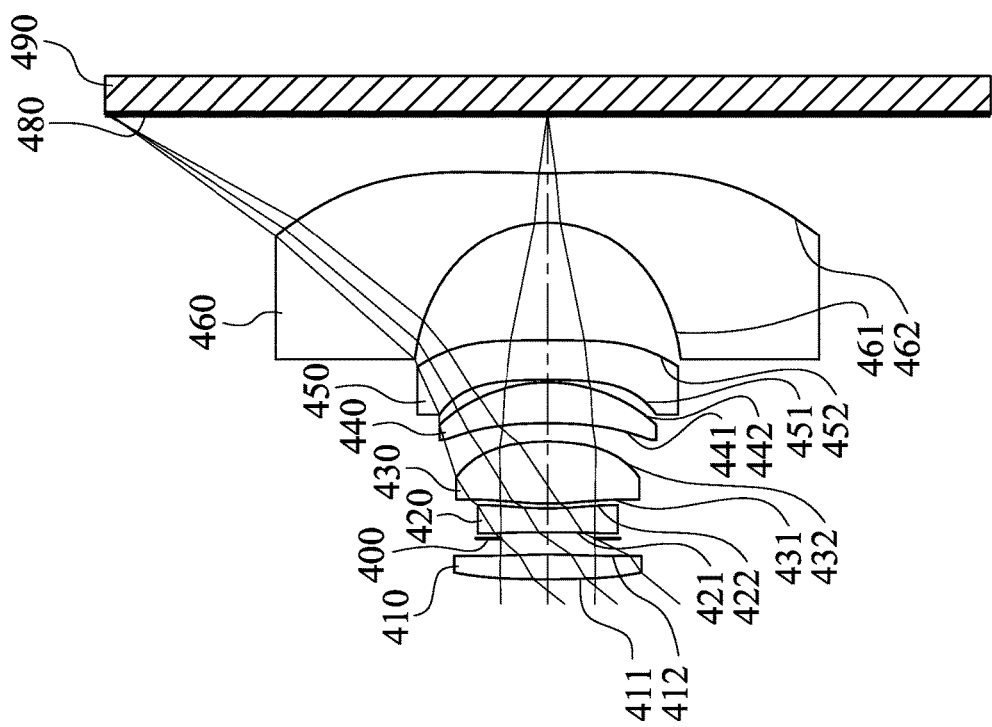
FIG. 7 is a schematic view of an image capturing apparatus according to the 4th embodiment of the present disclosure.
Figure 8:
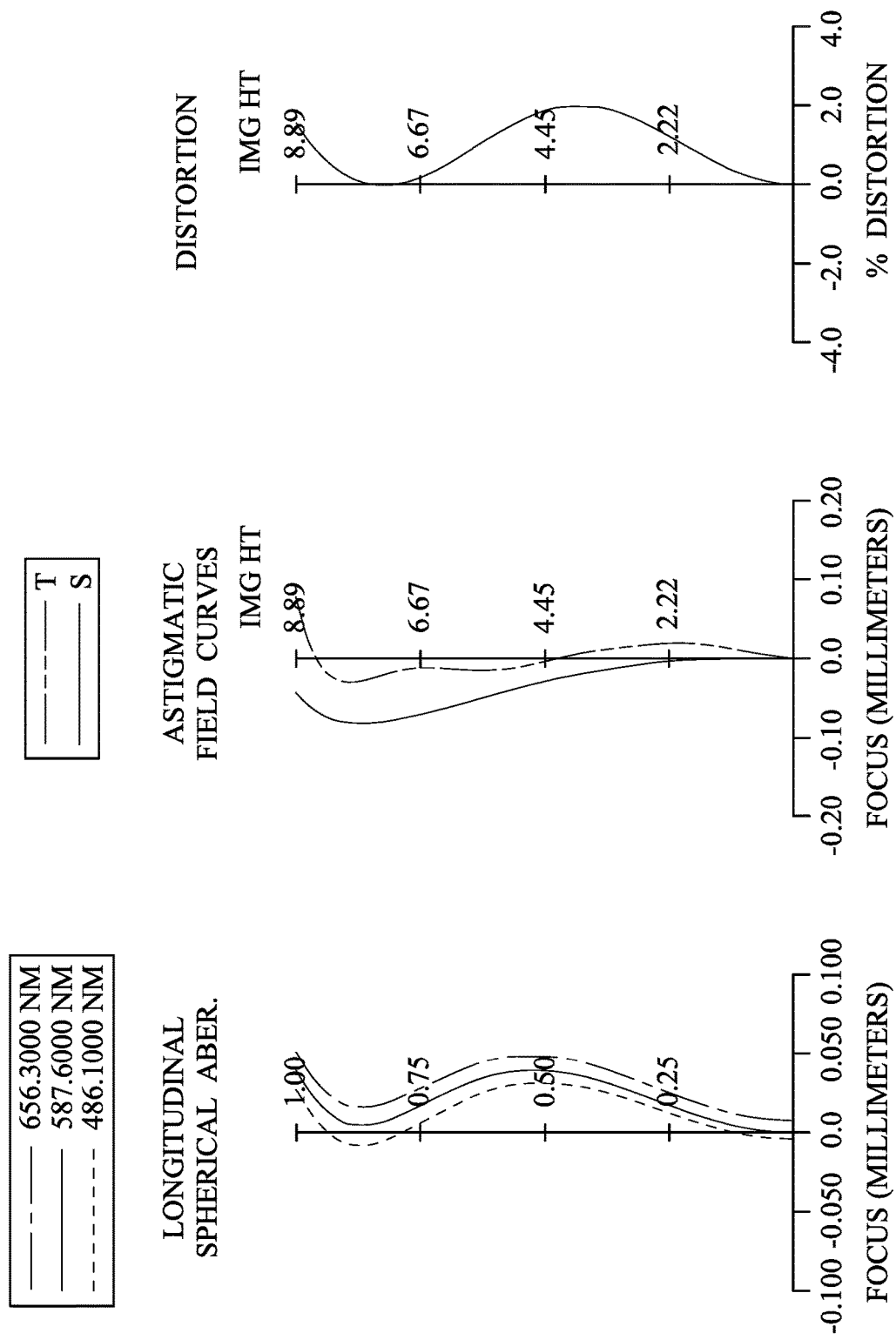
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows, in order from left to right, spherical aberration curves, astigmatic field curves and a distortion curve of the image capturing apparatus according to the 4th embodiment. In FIG. 7, the image capturing apparatus includes the imaging lens assembly (its reference numeral is omitted) and an image sensor 490. The imaging lens assembly includes, in order from an object side to an image side, a first lens element 410, an aperture stop 400, a second lens element 420, a third lens element 430, a fourth lens element 440, a fifth lens element 450, a sixth lens element 460 and an image surface 480. The image sensor 490 is disposed on the image surface 480 of the imaging lens assembly. The imaging lens assembly has a total of six lens elements (410-460). Moreover, there is an air gap between every two of the first lens element 410, the second lens element 420, the third lens element 430, the fourth lens element 440, the fifth lens element 450 and the sixth lens element 460 that are adjacent to each other.

The first lens element 410 with positive refractive power has an object-side surface 411 being convex in a paraxial region thereof and an image-side surface 412 being convex in a paraxial region thereof. The first lens element 410 is made of a plastic material, and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of a plastic material, and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of a plastic material, and has the object-side surface 441 and the image-side surface 442 being both aspheric.

The fifth lens element 450 with negative refractive power has an object-side surface 451 being concave in a paraxial region thereof and an image-side surface 452 being convex in a paraxial region thereof. The fifth lens element 450 is made of a plastic material, and has the object-side surface 451 and the image-side surface 452 being both aspheric.

The sixth lens element 460 with negative refractive power has an object-side surface 461 being concave in a paraxial region thereof and an image-side surface 462 being concave in a paraxial region thereof. The sixth lens element 460 is made of a plastic material, and has the object-side surface 461 and the image-side surface 462 being both aspheric. Furthermore, the image-side surface 462 of the sixth lens element 460 includes at least one convex shape in an off-axial region thereof.

The detailed optical data of the 4th embodiment are shown in TABLE 7 and the aspheric surface data are shown in TABLE 8 below.

TABLE 7

4th Embodiment
f = 5.75 mm, Fno = 3.60, HFOV = 51.1 deg.

| Surface # | | Curvature Radius | | Thickness | Material | Index | Abbe # | Focal Length |
|---|---|---|---|---|---|---|---|---|
| 0 | Object | Plano | | 50.600 | | | | |
| 1 | Lens 1 | 30.237 | ASP | 0.500 | Plastic | 1.544 | 55.9 | 17.61 |
| 2 | | −13.952 | ASP | 0.325 | | | | |
| 3 | Ape. Stop | Plano | | 0.122 | | | | |
| 4 | Lens 2 | 95.546 | ASP | 0.500 | Plastic | 1.639 | 23.5 | −10.76 |
| 5 | | 6.403 | ASP | 0.100 | | | | |
| 6 | Lens 3 | 6.632 | ASP | 1.251 | Plastic | 1.544 | 55.9 | 5.47 |

TABLE 7-continued

4th Embodiment
f = 5.75 mm, Fno = 3.60, HFOV = 51.1 deg.

| Surface # | | Curvature Radius | | Thickness | Material | Index | Abbe # | Focal Length |
|---|---|---|---|---|---|---|---|---|
| 7 | | −5.034 | ASP | 0.374 | | | | |
| 8 | Lens 4 | −9.593 | ASP | 0.826 | Plastic | 1.544 | 55.9 | 7.94 |
| 9 | | −3.068 | ASP | 0.050 | | | | |
| 10 | Lens 5 | −17.449 | ASP | 0.800 | Plastic | 1.639 | 23.5 | −31.19 |
| 11 | | −142.552 | ASP | 2.391 | | | | |
| 12 | Lens 6 | −2.555 | ASP | 1.000 | Plastic | 1.544 | 55.9 | −4.22 |
| 13 | | 25.807 | ASP | 1.205 | | | | |
| 14 | Image | Plano | | — | | | | |

Reference wavelength is 587.6 nm (d-line).

TABLE 8

Aspheric Coefficients

| Surface # | | | | | |
|---|---|---|---|---|---|
| 1 | 2 | 4 | 5 | 6 | 7 |
| k = −4.8434E+01 | 1.0000E+00 | −5.0000E+01 | −4.4130E+01 | −4.9992E+01 | 5.0381E+00 |
| A4 = 3.4619E−03 | 1.3692E−02 | −1.5675E−02 | −8.2770E−03 | −1.9577E−03 | −1.7765E−02 |
| A6 = 2.0455E−03 | 8.4017E−04 | 1.2070E−03 | −1.5316E−03 | −1.8484E−03 | −1.1221E−03 |
| A8 = −1.6012E−04 | −9.6123E−04 | −3.3722E−03 | −4.4905E−04 | −3.1019E−04 | 4.3691E−04 |
| A10 = −5.5388E−05 | 5.3101E−05 | −1.0020E−03 | −2.8741E−05 | 2.4865E−05 | −1.0699E−04 |

| Surface # | | | | | |
|---|---|---|---|---|---|
| 8 | 9 | 10 | 11 | 12 | 13 |
| k = 4.2041E+00 | −1.4994E+00 | 4.3202E+01 | −1.0000E+00 | −1.1448E−01 | −1.0000E+00 |
| A4 = −6.6415E−03 | −1.1528E−03 | −1.5268E−02 | −1.1467E−02 | −2.4251E−03 | −4.0392E−03 |
| A6 = −1.8699E−04 | −5.0613E−04 | −1.1094E−03 | −1.6958E−04 | −6.7027E−05 | 1.2310E−04 |
| A8 = 5.2774E−05 | −4.5455E−05 | −6.6127E−05 | 2.4504E−06 | −9.6739E−05 | −2.6789E−06 |
| A10 = 1.9105E−05 | −6.3086E−06 | −3.3102E−06 | 6.2084E−06 | 8.4509E−06 | 2.6647E−08 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from TABLE 7 and TABLE 8 as the following values and satisfy the following conditions:

| 4th Embodiment | | | |
|---|---|---|---|
| f (mm) | 5.75 | T56/T45 | 47.82 |
| Fno | 3.60 | T56/(T56 − SAG52 + SAG61) | 16.25 |
| HFOV (deg.) | 51.1 | TL/(tan(CRA1.0Y) × ImgH) | 0.69 |
| CRA1.0Y (deg.) | 56.8 | SAG62/CT6 | −1.27 |
| HFOV/CRA1.0Y | 0.90 | SDmax/SDmin | 5.13 |
| EPD/BL | 1.33 | SD62/EPD | 3.44 |
| SD/ImgH | 0.83 | (R11 + R12)/(R11 − R12) | −0.82 |

Furthermore, in the imaging lens assembly according to the 4th embodiment, when a focal length of the first lens element 410 is f1, a focal length of the second lens element 420 is f2, a focal length of the third lens element 430 is f3, a focal length of the fourth lens element 440 is f4, a focal length of the fifth lens element 450 is f5, and a focal length of the sixth lens element 460 is f6, the following conditions are satisfied: |f6|<|f3|<|f1|, |f6|<|f3|<|f2|; |f6|<|f3|<|f4|; and |f6|<|f3|<|f5|.

In the imaging lens assembly according to the 4th embodiment, when an Abbe number of the first lens element 410 is V1, an Abbe number of the second lens element 420 is V2, an Abbe number of the third lens element 430 is V3, an Abbe number of the fourth lens element 440 is V4, an Abbe number of the fifth lens element 450 is V5, and an Abbe number of the sixth lens element 460 is V6, there are four values (V1, V3, V4 and V6) are greater than 50.

<5th Embodiment>

Figure 9:
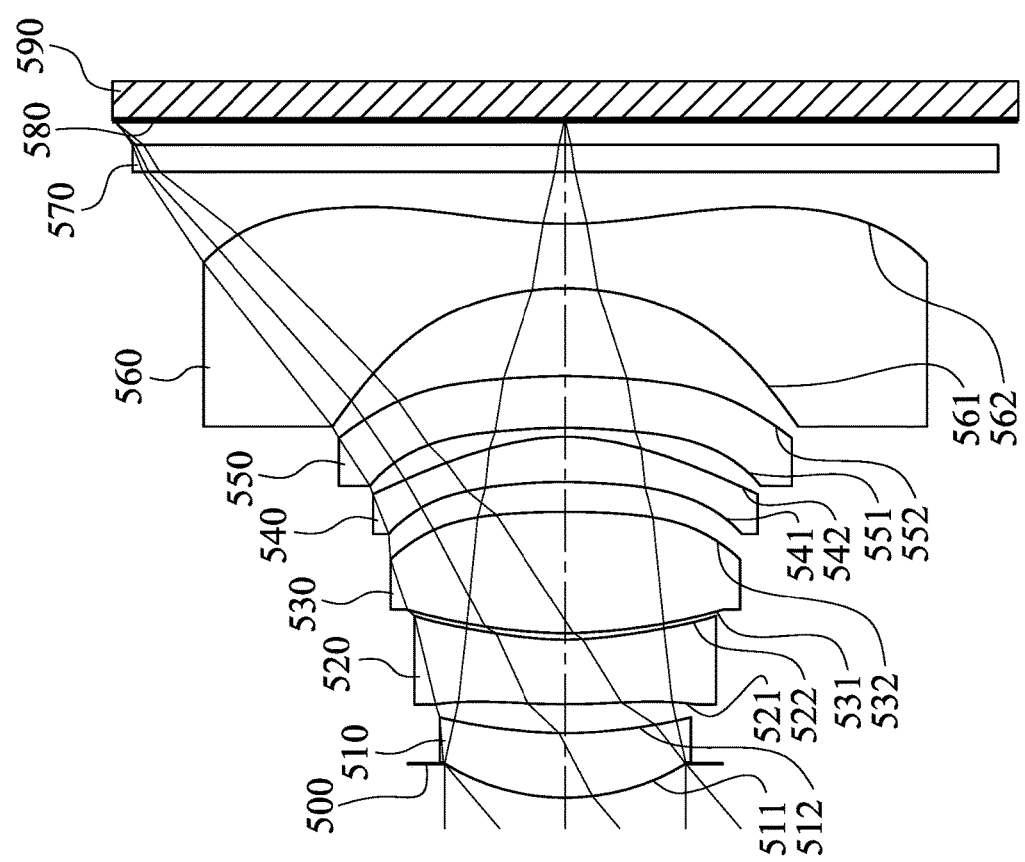
FIG. 9 is a schematic view of an image capturing apparatus according to the 5th embodiment of the present disclosure.
Figure 10:
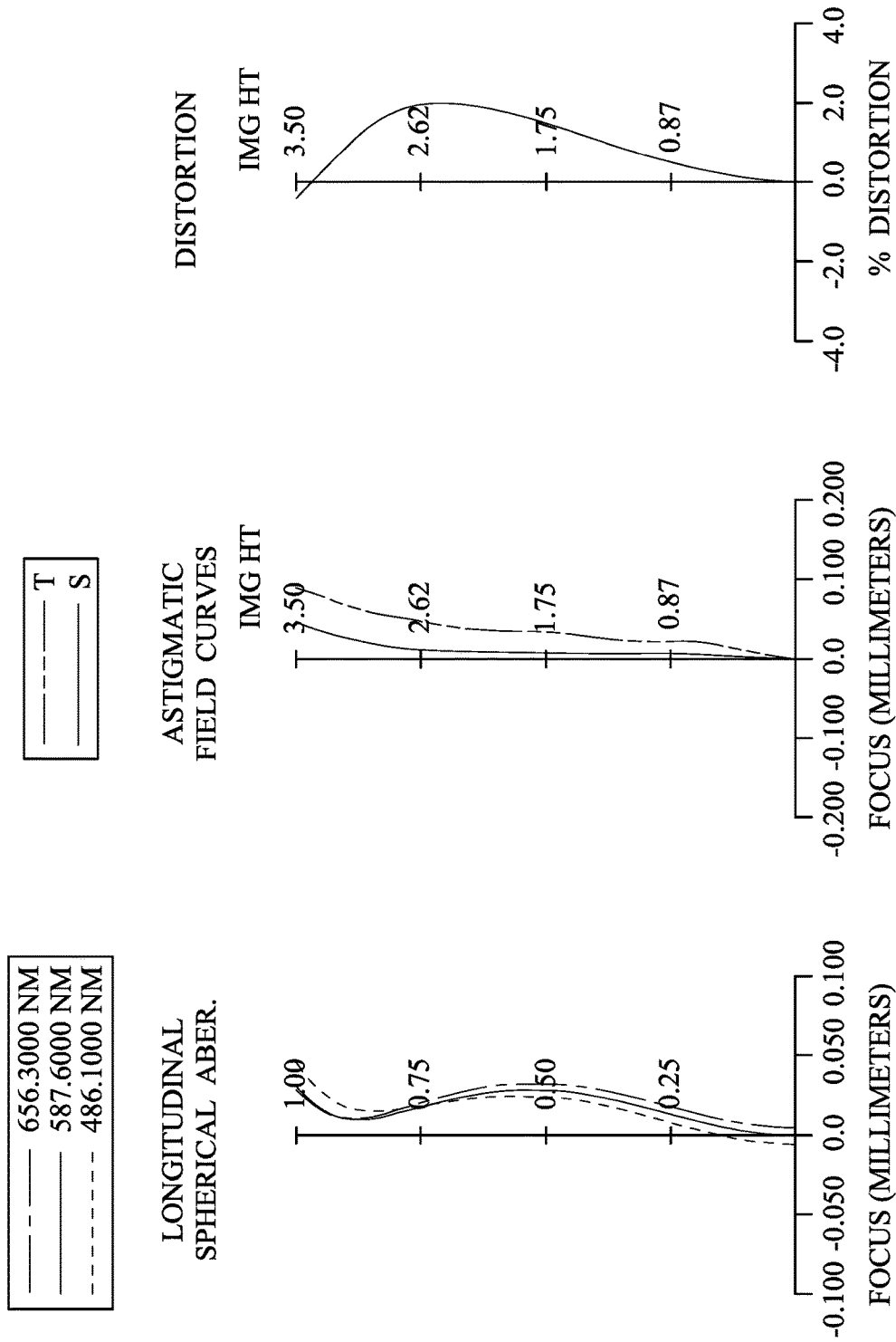
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows, in order from left to right, spherical aberration curves, astigmatic field curves and a distortion curve of the image capturing apparatus according to the 5th embodiment. In FIG. 9, the image capturing apparatus includes the imaging lens assembly (its reference numeral is omitted) and an image sensor 590. The imaging lens assembly includes, in order from an object side to an image side, an aperture stop 500, a first lens element 510, a second lens element 520, a third lens element 530, a fourth lens element 540, a fifth lens element 550, a sixth lens element 560, an IR-cut filter 570 and an image surface 580. The image sensor 590 is disposed on the image surface 580 of the imaging lens assembly. The imaging lens assembly has a total of six lens elements (510-560). Moreover, there is an air gap between every two of the first lens element 510, the second lens element 520, the third lens element 530, the fourth lens element 540, the fifth lens element 550 and the sixth lens element 560 that are adjacent to each other.

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of a plastic material, and has the object-side surface 531 and the image-side surface 532 being both aspheric.

The fourth lens element 540 with positive refractive power has an object-side surface 541 being concave in a paraxial region thereof and an image-side surface 542 being convex in a paraxial region thereof. The fourth lens element 540 is made of a plastic material, and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of a plastic material, and has the object-side surface 551 and the image-side surface 552 being both aspheric.

The sixth lens element 560 with negative refractive power has an object-side surface 561 being concave in a paraxial region thereof and an image-side surface 562 being concave in a paraxial region thereof. The sixth lens element 560 is made of a plastic material, and has the object-side surface 561 and the image-side surface 562 being both aspheric. Furthermore, the image-side surface 562 of the sixth lens element 560 includes at least one convex shape in an off-axial region thereof.

The IR-cut filter 570 is made of a glass material and located between the sixth lens element 560 and the image surface 580, and will not affect the focal length of the imaging lens assembly.

The detailed optical data of the 5th embodiment are shown in TABLE 9 and the aspheric surface data are shown in TABLE 10 below.

TABLE 9

5th Embodiment
f = 4.11 mm, Fno = 2.20, HFOV = 40.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.261 | | | | |
| 2 | Lens 1 | 1.813 | ASP | 0.500 | Plastic | 1.544 | 55.9 | 6.36 |
| 3 | | 3.437 | ASP | 0.223 | | | | |
| 4 | Lens 2 | 5.534 | ASP | 0.500 | Plastic | 1.660 | 20.4 | −7.71 |
| 5 | | 2.555 | ASP | 0.050 | | | | |
| 6 | Lens 3 | 3.187 | ASP | 0.943 | Plastic | 1.544 | 55.9 | 4.23 |
| 7 | | −7.423 | ASP | 0.231 | | | | |
| 8 | Lens 4 | −4.907 | ASP | 0.350 | Plastic | 1.544 | 55.9 | 4.55 |
| 9 | | −1.687 | ASP | 0.069 | | | | |
| 10 | Lens 5 | −4.044 | ASP | 0.400 | Plastic | 1.660 | 20.4 | −31.68 |
| 11 | | −5.211 | ASP | 0.684 | | | | |
| 12 | Lens 6 | −2.143 | ASP | 0.500 | Plastic | 1.515 | 56.5 | −2.58 |
| 13 | | 3.752 | ASP | 0.400 | | | | |
| 14 | IR-cut filter | Plano | | 0.210 | Glass | 1.517 | 64.2 | — |
| 15 | | Plano | | 0.191 | | | | |
| 16 | Image | Plano | | — | | | | |

Reference wavelength is 587.6 nm (d-line).

TABLE 10

Aspheric Coefficients

| Surface # | | | | | |
|---|---|---|---|---|---|
| 2 | 3 | 4 | 5 | 6 | 7 |
| k = −9.3991E−01 | 1.0000E+00 | −1.0000E+00 | −1.3358E+01 | −2.2470E+01 | −4.7831E+01 |
| A4 = 1.2044E−02 | −5.6540E−02 | −1.1870E−01 | −4.8862E−02 | −1.8348E−02 | −5.5981E−02 |
| A6 = 3.1652E−02 | 7.9510E−02 | 8.3021E−02 | 8.0258E−02 | 6.1627E−02 | −1.5302E−02 |
| A8 = −2.5808E−02 | −1.0596E−01 | −1.0404E−01 | −6.2083E−02 | −4.6880E−02 | −6.8982E−03 |
| A10 = 1.7281E−02 | 6.1510E−02 | 4.9159E−02 | 2.1604E−02 | 1.3010E−02 | 4.1983E−03 |

TABLE 10-continued

Aspheric Coefficients

| | Surface # | | | | | |
|---|---|---|---|---|---|---|
| | 8 | 9 | 10 | 11 | 12 | 13 |
| k = | 1.0795E+01 | −8.0843E+00 | −5.0000E+01 | −1.0000E+00 | −1.3674E+00 | −1.0002E+00 |
| A4 = | −2.1733E−02 | −3.6955E−02 | 3.7999E−02 | 5.2562E−02 | 7.7208E−03 | −4.6542E−02 |
| A6 = | 2.8317E−02 | 1.2012E−02 | −1.0694E−01 | −6.8645E−02 | −4.0921E−02 | 7.1018E−03 |
| A8 = | −4.4345E−02 | 7.8435E−04 | 4.8624E−02 | 2.2258E−02 | 1.2229E−02 | −6.5051E−04 |
| A10 = | 1.4169E−02 | −8.0410E−04 | −8.8174E−03 | −2.4626E−03 | −1.1067E−03 | 1.8677E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from TABLE 9 and TABLE 10 as the following values and satisfy the following conditions:

| 5th Embodiment | | | |
|---|---|---|---|
| f (mm) | 4.11 | T56/T45 | 9.91 |
| Fno | 2.20 | T56/(T56 − SAG52 + SAG61) | 7.60 |
| HFOV (deg.) | 40.4 | TL/(tan(CRA1.0Y) × ImgH) | 1.67 |
| CRA1.0Y (deg.) | 42.0 | SAG62/CT6 | −0.60 |
| HFOV/CRA1.0Y | 0.96 | SDmax/SDmin | 2.97 |
| EPD/BL | 2.33 | SD62/EPD | 1.50 |
| SD/ImgH | 1.20 | (R11 + R12)/(R11 − R12) | −0.27 |

Furthermore, in the imaging lens assembly according to the 5th embodiment, when a focal length of the first lens element 510 is f1, a focal length of the second lens element 520 is f2, a focal length of the third lens element 530 is f3, a focal length of the fourth lens element 540 is f4, a focal length of the fifth lens element 550 is f5, and a focal length of the sixth lens element 560 is f6, the following conditions are satisfied: |f6|<|f3|<|f1|; |f6|<|f3|<|f2|; |f6|<|f3|<|f4|; and |f6|<|f3|<|f5|.

In the imaging lens assembly according to the 5th embodiment, when an Abbe number of the first lens element 510 is V1, an Abbe number of the second lens element 520 is V2, an Abbe number of the third lens element 530 is V3, an Abbe number of the fourth lens element 540 is V4, an Abbe number of the fifth lens element 550 is V5, and an Abbe number of the sixth lens element 560 is V6, there are four values (V1, V3, V4 and V6) are greater than 50.

<6th Embodiment>

Figure 11:
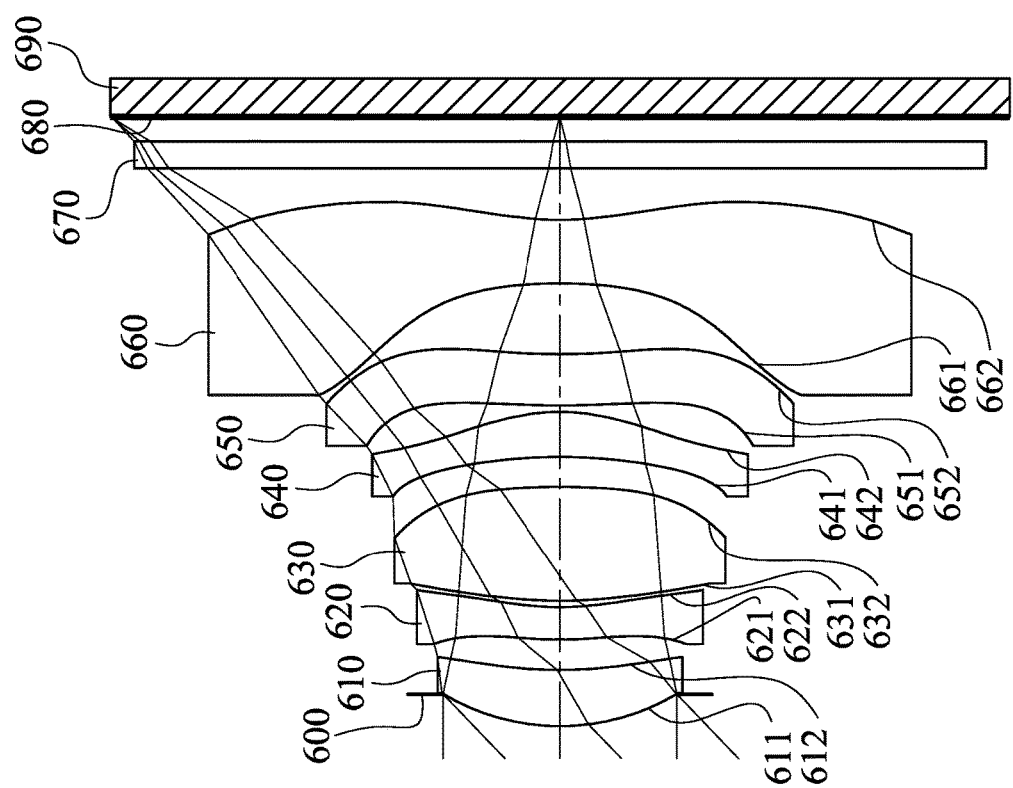
FIG. 11 is a schematic view of an image capturing apparatus according to the 6th embodiment of the present disclosure.
Figure 12:
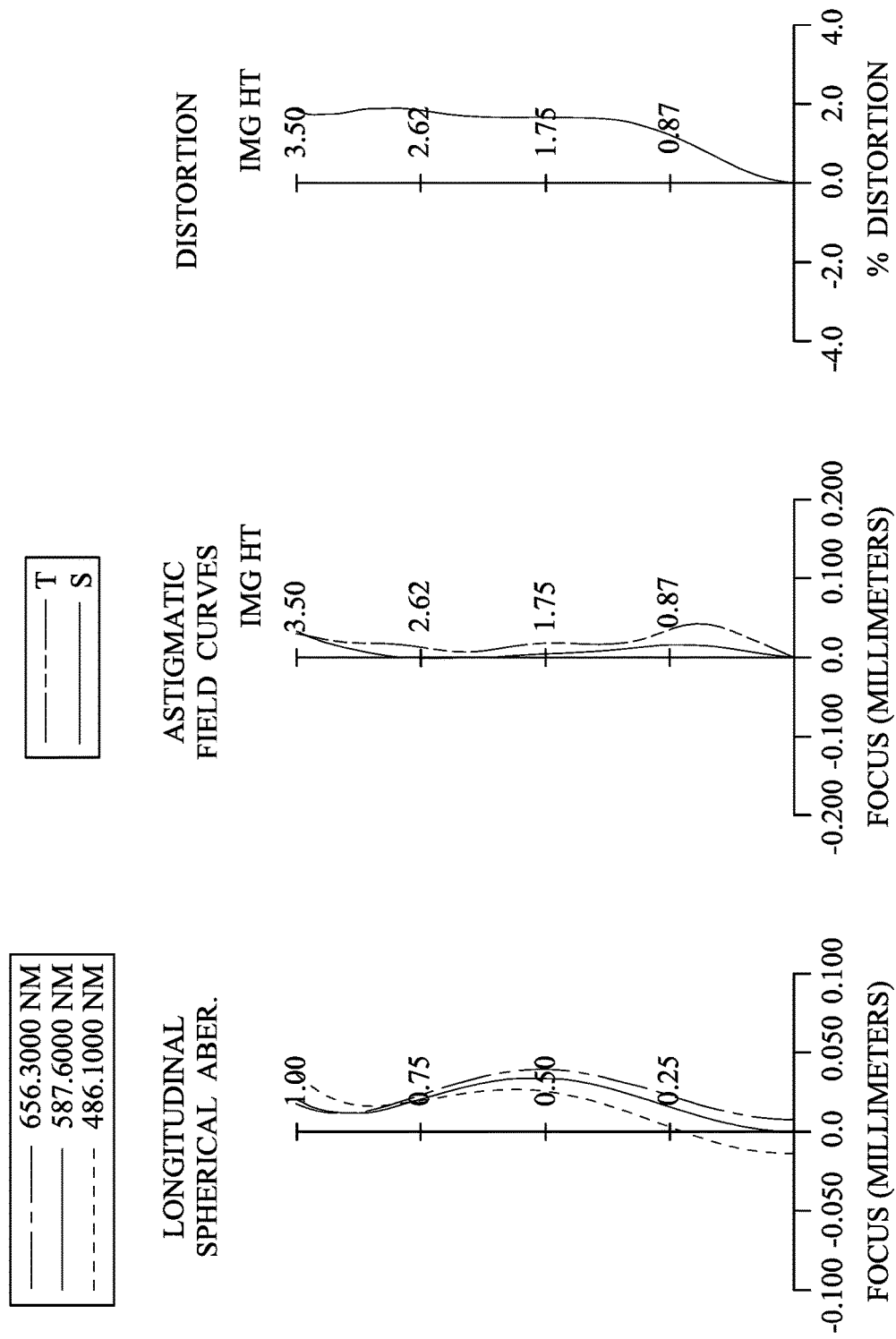
FIG. 12 shows spherical aberration curves, astigmatic field curves and a distortion curve of the image capturing apparatus according to the 6th embodiment.

FIG. 11 is a schematic view of an image capturing apparatus according to the 6th embodiment of the present disclosure. FIG. 12 shows, in order from left to right, spherical aberration curves, astigmatic field curves and a distortion curve of the image capturing apparatus according to the 6th embodiment. In FIG. 11, the image capturing apparatus includes the imaging lens assembly (its reference numeral is omitted) and an image sensor 690. The imaging lens assembly includes, in order from an object side to an image side, an aperture stop 600, a first lens element 610, a second lens element 620, a third lens element 630, a fourth lens element 640, a fifth lens element 650, a sixth lens element 660, an IR-cut filter 670 and an image surface 680.

The image sensor 690 is disposed on the image surface 680 of the imaging lens assembly. The imaging lens assembly has a total of six lens elements (610-660). Moreover, there is an air gap between every two of the first lens element 610, the second lens element 620, the third lens element 630, the fourth lens element 640, the fifth lens element 650 and the sixth lens element 660 that are adjacent to each other.

The first lens element 610 with positive refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of a plastic material, and has the object-side surface 631 and the image-side surface 632 being both aspheric.

The fourth lens element 640 with positive refractive power has an object-side surface 641 being concave in a paraxial region thereof and an image-side surface 642 being convex in a paraxial region thereof. The fourth lens element 640 is made of a plastic material, and has the object-side surface 641 and the image-side surface 642 being both aspheric.

The fifth lens element 650 with negative refractive power has an object-side surface 651 being convex in a paraxial region thereof and an image-side surface 652 being concave in a paraxial region thereof. The fifth lens element 650 is made of a plastic material, and has the object-side surface 651 and the image-side surface 652 being both aspheric.

The sixth lens element 660 with negative refractive power has an object-side surface 661 being concave in a paraxial region thereof and an image-side surface 662 being concave in a paraxial region thereof. The sixth lens element 660 is made of a plastic material, and has the object-side surface 661 and the image-side surface 662 being both aspheric. Furthermore, the image-side surface 662 of the sixth lens element 660 includes at least one convex shape in an off-axial region thereof.

The IR-cut filter 670 is made of a glass material and located between the sixth lens element 660 and the image surface 680, and will not affect the focal length of the imaging lens assembly.

The detailed optical data of the 6th embodiment are shown in TABLE 11 and the aspheric surface data are shown in TABLE 12 below.

TABLE 11

6th Embodiment
f = 3.55 mm, Fno = 1.95, HFOV = 43.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.248 | | | | |
| 2 | Lens 1 | 1.786 | ASP | 0.437 | Plastic | 1.544 | 55.9 | 6.35 |
| 3 | | 3.377 | ASP | 0.239 | | | | |
| 4 | Lens 2 | 3.717 | ASP | 0.250 | Plastic | 1.660 | 20.4 | −9.11 |
| 5 | | 2.236 | ASP | 0.050 | | | | |
| 6 | Lens 3 | 3.911 | ASP | 0.891 | Plastic | 1.544 | 55.9 | 4.47 |
| 7 | | −5.918 | ASP | 0.234 | | | | |
| 8 | Lens 4 | −3.856 | ASP | 0.350 | Plastic | 1.544 | 55.9 | 4.65 |
| 9 | | −1.577 | ASP | 0.050 | | | | |
| 10 | Lens 5 | 7.342 | ASP | 0.400 | Plastic | 1.639 | 23.5 | −32.17 |
| 11 | | 5.294 | ASP | 0.550 | | | | |
| 12 | Lens 6 | −3.937 | ASP | 0.500 | Plastic | 1.544 | 55.9 | −2.85 |
| 13 | | 2.671 | ASP | 0.400 | | | | |
| 14 | IR-cut filter | Plano | | 0.210 | Glass | 1.517 | 64.2 | — |
| 15 | | Plano | | 0.190 | | | | |
| 16 | Image | Plano | | — | | | | |

Reference wavelength is 587.6 nm (d-line).

TABLE 12

Aspheric Coefficients

| | Surface # | | | | | |
|---|---|---|---|---|---|---|
| | 2 | 3 | 4 | 5 | 6 | 7 |
| k = | −8.6744E−01 | 1.0000E+00 | −1.0000E+00 | −3.6590E+00 | −2.4112E+01 | −4.7851E+01 |
| A4 = | 1.6296E−02 | −4.4842E−02 | −2.0404E−01 | −1.3732E−01 | 2.1621E−02 | −6.5314E−02 |
| A6 = | 1.0704E−02 | 1.0621E−02 | 7.1462E−02 | 6.7485E−02 | −3.3823E−02 | −4.7417E−02 |
| A8 = | 4.2208E−04 | −6.9362E−03 | −5.9552E−02 | −2.6286E−02 | 1.6099E−02 | 1.1690E−02 |
| A10 = | 1.2134E−03 | −8.3038E−03 | 1.2243E−02 | 1.2488E−02 | −2.0231E−04 | 1.0800E−03 |

| | Surface # | | | | | |
|---|---|---|---|---|---|---|
| | 8 | 9 | 10 | 11 | 12 | 13 |
| k = | 7.4884E+00 | −7.9776E+00 | −4.7178E+01 | −1.0000E+00 | −7.9079E+00 | −1.1250E+00 |
| A4 = | 5.6414E−02 | −9.6645E−02 | −2.8223E−02 | −4.6854E−02 | −6.9972E−02 | −8.7959E−02 |
| A6 = | −4.1564E−02 | 1.2165E−01 | −3.1882E−02 | −1.6954E−02 | −3.0491E−02 | 1.8737E−02 |
| A8 = | 1.6029E−02 | −4.4810E−02 | 1.3335E−02 | 4.7055E−03 | 1.7895E−02 | −2.0595E−03 |
| A10 = | −2.1909E−03 | 5.1512E−03 | −4.3825E−03 | −3.4456E−04 | −1.9900E−03 | 8.7784E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from TABLE 11 and TABLE 12 as the following values and satisfy the following conditions:

| 6th Embodiment | | | |
|---|---|---|---|
| f (mm) | 3.55 | T56/T45 | 11.00 |
| Fno | 1.95 | T56/(T56 − SAG52 + SAG61) | 8.14 |
| HFOV (deg.) | 43.9 | TL/(tan(CRA1.0Y) × ImgH) | 1.14 |
| CRA1.0Y (deg.) | 49.9 | SAG62/CT6 | −0.23 |

| -continued | | | |
|---|---|---|---|
| 6th Embodiment | | | |
| HFOV/CRA1.0Y | 0.88 | SDmax/SDmin | 2.98 |
| EPD/BL | 2.28 | SD62/EPD | 1.51 |
| SD/ImgH | 1.06 | (R11 + R12)/(R11 − R12) | 0.19 |

Furthermore, in the imaging lens assembly according to the 6th embodiment, when a focal length of the first lens element 610 is f1, a focal length of the second lens element 620 is f2, a focal length of the third lens element 630 is f3, a focal length of the fourth lens element 640 is f4, a focal length of the fifth lens element 650 is f5, and a focal length of the sixth lens element 660 is f6, the following conditions are satisfied: |f6|<|f3|<|f1|; |f6|<|f3|<|f2|; |f6|<|f3|<|f4|; and |f6|<|f3|<|f5|.

In the imaging lens assembly according to the 6th embodiment, when an Abbe number of the first lens element 610 is V1, an Abbe number of the second lens element 620 is V2, an Abbe number of the third lens element 630 is V3, an Abbe number of the fourth lens element 640 is V4, an Abbe number of the fifth lens element 650 is V5, and an Abbe number of the sixth lens element 660 is V6, there are four values (V1, V3, V4 and V6) are greater than 50.

<7th Embodiment>

Figure 13:
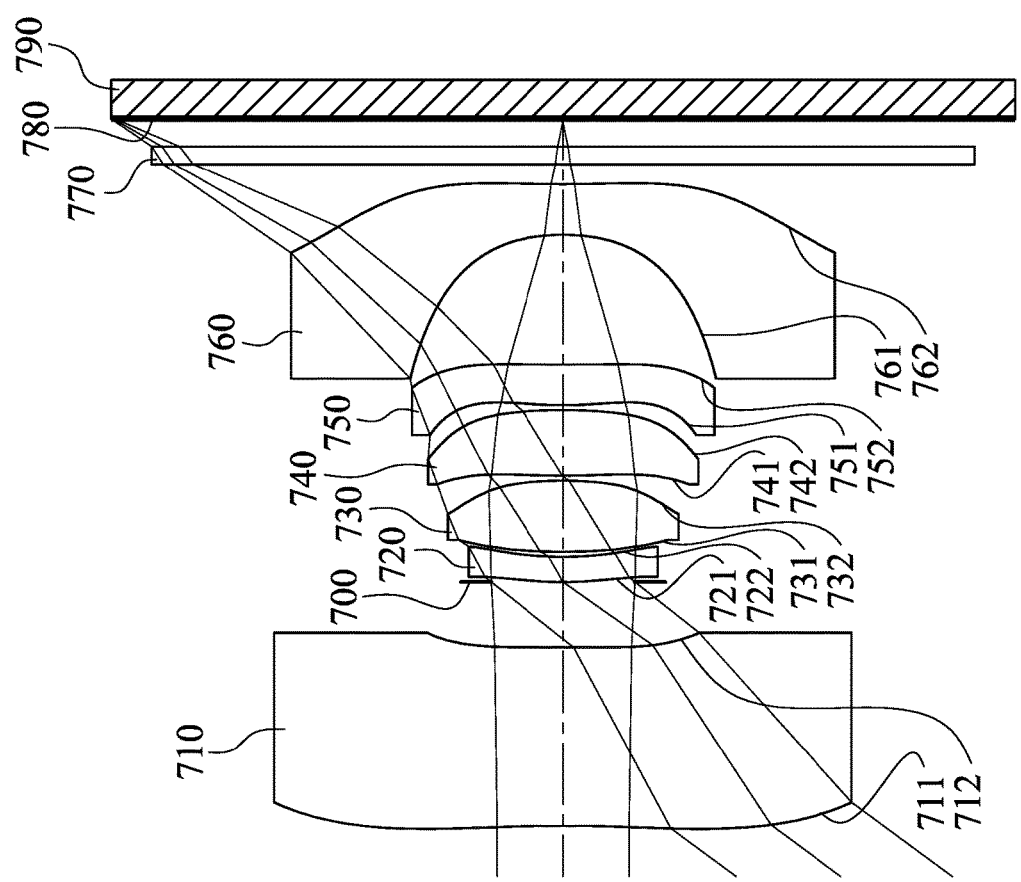
FIG. 13 is a schematic view of an image capturing apparatus according to the 7th embodiment of the present disclosure.
Figure 14:
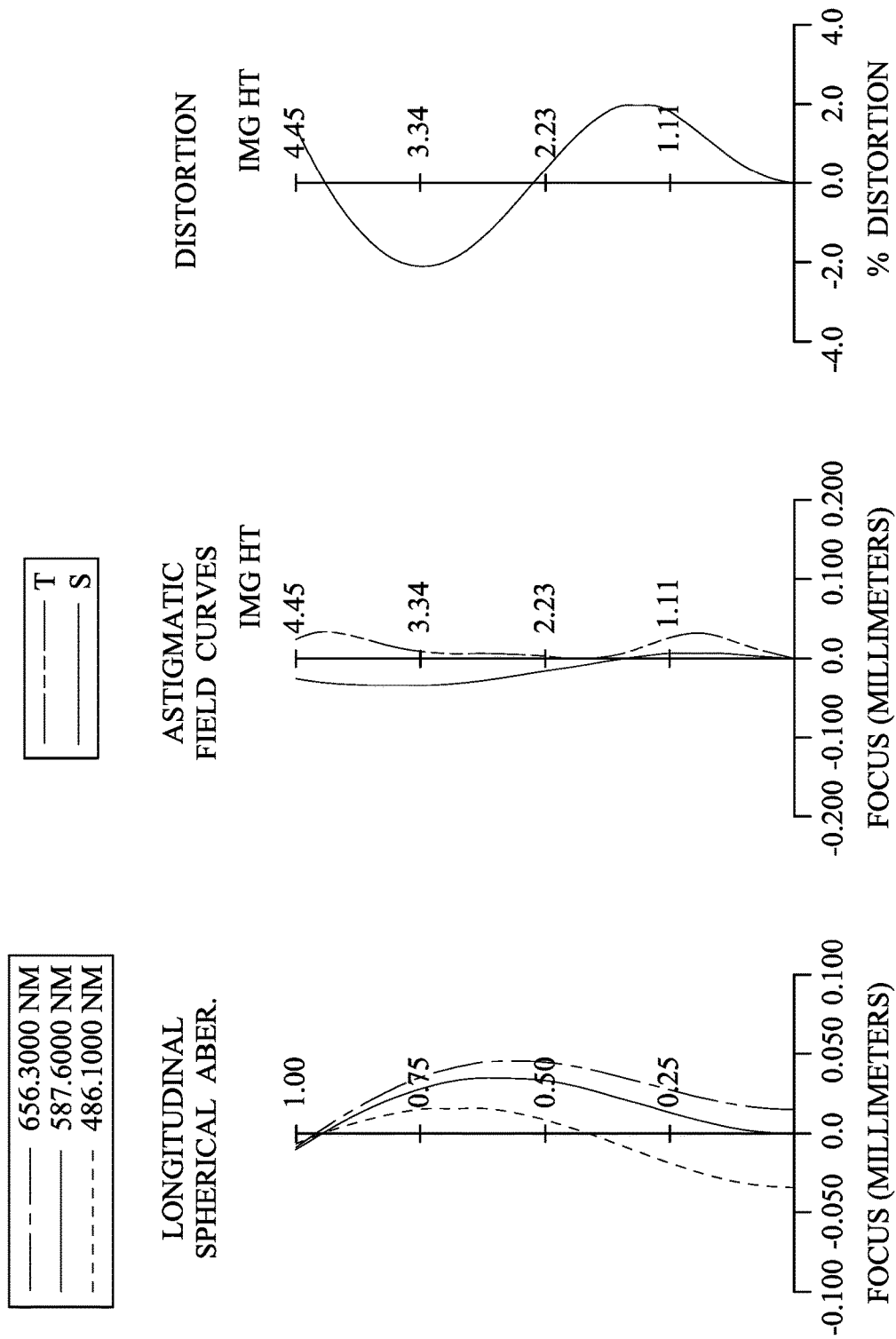
FIG. 14 shows spherical aberration curves, astigmatic field curves and a distortion curve of the image capturing apparatus according to the 7th embodiment.

FIG. 13 is a schematic view of an image capturing apparatus according to the 7th embodiment of the present disclosure. FIG. 14 shows, in order from left to right, spherical aberration curves, astigmatic field curves and a distortion curve of the image capturing apparatus according to the 7th embodiment. In FIG. 13, the image capturing apparatus includes the imaging lens assembly (its reference numeral is omitted) and an image sensor 790. The imaging lens assembly includes, in order from an object side to an image side, a first lens element 710, an aperture stop 700, a second lens element 720, a third lens element 730, a fourth lens element 740, a fifth lens element 750, a sixth lens element 760, an IR-cut filter 770 and an image surface 780. The image sensor 790 is disposed on the image surface 780 of the imaging lens assembly. The imaging lens assembly has a total of six lens elements (710-760). Moreover, there is an air gap between every two of the first lens element 710, the second lens element 720, the third lens element 730, the fourth lens element 740, the fifth lens element 750 and the sixth lens element 760 that are adjacent to each other.

The first lens element 710 with negative refractive power has an object-side surface 711 being concave in a paraxial region thereof and an image-side surface 712 being convex in a paraxial region thereof. The first lens element 710 is made of a plastic material, and has the object-side surface 711 and the image-side surface 712 being both aspheric.

The second lens element 720 with positive refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of a plastic material, and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of a plastic material, and has the object-side surface 741 and the image-side surface 742 being both aspheric.

The fifth lens element 750 with positive refractive power has an object-side surface 751 being convex in a paraxial region thereof and an image-side surface 752 being concave in a paraxial region thereof. The fifth lens element 750 is made of a plastic material, and has the object-side surface 751 and the image-side surface 752 being both aspheric.

The sixth lens element 760 with negative refractive power has an object-side surface 761 being concave in a paraxial region thereof and an image-side surface 762 being concave in a paraxial region thereof. The sixth lens element 760 is made of a plastic material, and has the object-side surface 761 and the image-side surface 762 being both aspheric. Furthermore, the image-side surface 762 of the sixth lens element 760 includes at least one convex shape in an off-axial region thereof.

The IR-cut filter 770 is made of a glass material and located between the sixth lens element 760 and the image surface 780, and will not affect the focal length of the imaging lens assembly.

The detailed optical data of the 7th embodiment are shown in TABLE 13 and the aspheric surface data are shown in TABLE 14 below.

TABLE 13

7th Embodiment
f = 3.21 mm, Fno = 2.45, HFOV = 53.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −15.040 ASP | 1.768 | Plastic | 1.660 | 20.4 | −29.53 |
| 2 | | −68.979 ASP | 0.647 | | | | |
| 3 | Ape. Stop | Plano | −0.001 | | | | |
| 4 | Lens 2 | 3.972 ASP | 0.250 | Plastic | 1.660 | 20.4 | 106.93 |
| 5 | | 4.104 ASP | 0.050 | | | | |
| 6 | Lens 3 | 8.408 ASP | 0.700 | Plastic | 1.535 | 55.7 | 5.83 |
| 7 | | −4.808 ASP | 0.050 | | | | |
| 8 | Lens 4 | 8.366 ASP | 0.654 | Plastic | 1.544 | 55.9 | 6.54 |
| 9 | | −6.007 ASP | 0.050 | | | | |
| 10 | Lens 5 | 4.385 ASP | 0.400 | Plastic | 1.560 | 40.0 | 8.74 |
| 11 | | 40.926 ASP | 1.282 | | | | |
| 12 | Lens 6 | −1.997 ASP | 0.500 | Plastic | 1.660 | 20.4 | −2.56 |
| 13 | | 12.206 ASP | 0.200 | | | | |
| 14 | IR-cut filter | Plano | 0.175 | Glass | 1.517 | 64.2 | — |
| 15 | | Plano | 0.277 | | | | |
| 16 | Image | Plano | — | | | | |

Reference wavelength is 587.6 nm (d-line).

TABLE 14

Aspheric Coefficients

| Surface # | | | | | |
|---|---|---|---|---|---|
| 1 | 2 | 4 | 5 | 6 | 7 |
| k = −5.0000E+01 | 1.0000E+00 | 8.8326E+00 | 1.0711E+01 | 6.4746E+00 | 7.6046E+00 |
| A4 = 8.6096E−03 | 4.9098E−02 | −3.1973E−02 | 6.2997E−02 | 7.2906E−02 | −1.4876E−01 |
| A6 = −4.4337E−04 | −6.4282E−03 | −7.1784E−02 | −1.1763E−01 | −6.7360E−03 | 1.4832E−02 |
| A8 = 2.3782E−05 | 2.0816E−03 | −4.4529E−02 | 2.5530E−03 | −4.6302E−02 | −2.0816E−02 |
| A10 = −1.4437E−08 | 7.7149E−04 | −6.9770E−03 | −4.5409E−03 | 2.5810E−02 | 2.8691E−02 |

| Surface # | | | | | |
|---|---|---|---|---|---|
| 8 | 9 | 10 | 11 | 12 | 13 |
| k = −2.3322E+01 | 1.7046E+00 | −4.6255E+01 | −1.0000E+00 | 6.5443E−01 | −1.0000E+00 |
| A4 = −4.5935E−02 | −5.1987E−02 | −4.1109E−02 | 1.4894E−02 | −8.4257E−02 | −4.2340E−02 |
| A6 = −4.9284E−02 | −2.1801E−02 | −9.1503E−02 | −8.2590E−02 | 3.9218E−03 | 2.9344E−03 |
| A8 = 2.6563E−02 | −1.9916E−02 | 2.6367E−02 | 3.9301E−02 | −1.2453E−02 | 1.8921E−04 |
| A10 = −3.1344E−03 | 8.8211E−03 | −3.5920E−03 | −7.0284E−03 | 3.8620E−03 | −1.9683E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from TABLE 13 and TABLE 14 as the following values and satisfy the following conditions:

| 7th Embodiment | | | |
|---|---|---|---|
| f (mm) | 3.21 | T56/T45 | 25.64 |
| Fno | 2.45 | T56/(T56 − SAG52 + SAG61) | 13.73 |
| HFOV (deg.) | 53.6 | TL/(tan(CRA1.0Y) × ImgH) | 0.90 |
| CRA1.0Y (deg.) | 60.2 | SAG62/CT6 | −1.36 |
| HFOV/CRA1.0Y | 0.89 | SDmax/SDmin | 3.68 |
| EPD/BL | 2.01 | SD62/EPD | 2.05 |
| SD/ImgH | 0.88 | (R11 + R12)/(R11 − R12) | −0.72 |

Furthermore, in the imaging lens assembly according to the 7th embodiment, when a focal length of the first lens element 710 is f1, a focal length of the second lens element 720 is f2, a focal length of the third lens element 730 is f3, a focal length of the fourth lens element 740 is f4, a focal length of the fifth lens element 750 is f5, and a focal length of the sixth lens element 760 is f6, the following conditions are satisfied: |f6|<|f3|<|f1|; |f6|<|f3|<|f2|; |f6|<|f3|<|f4|; and |f6|<|f3|<|f5|.

<8th Embodiment>

Figure 20:
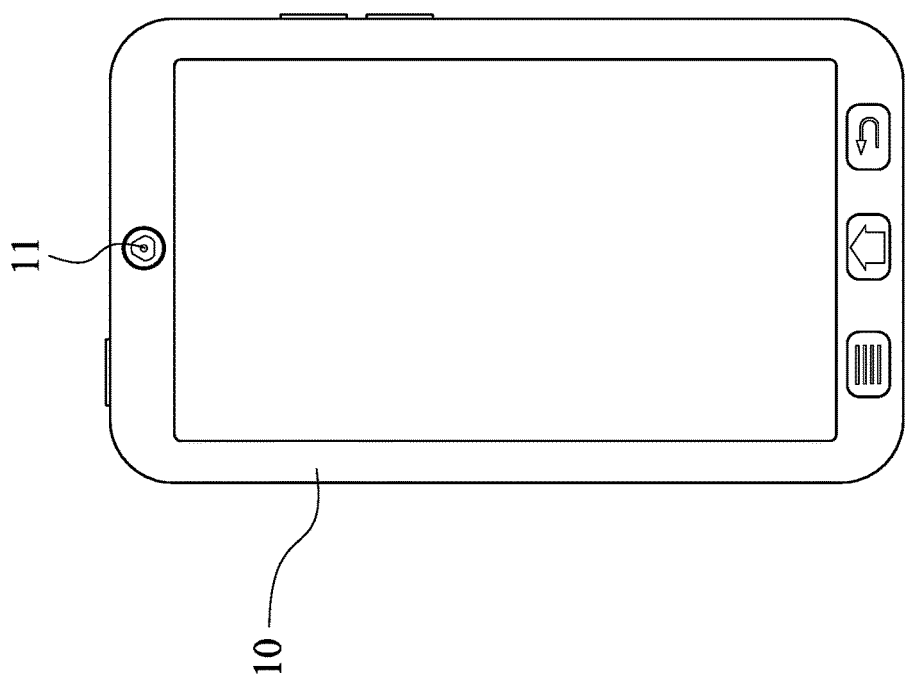
FIG. 20 shows an electronic device according to the 8th embodiment of the present disclosure.

FIG. 20 shows an electronic device 10 according to the 8th embodiment of the present disclosure. The electronic device 10 of the 8th embodiment is a smartphone, wherein the electronic device 10 includes an image capturing apparatus 11. The image capturing apparatus 11 includes an imaging lens assembly (its reference numeral is omitted) according to the present disclosure and an image sensor (its reference numeral is omitted), wherein the image sensor is disposed on an image surface of the imaging lens assembly.

<9th Embodiment>

Figure 21:
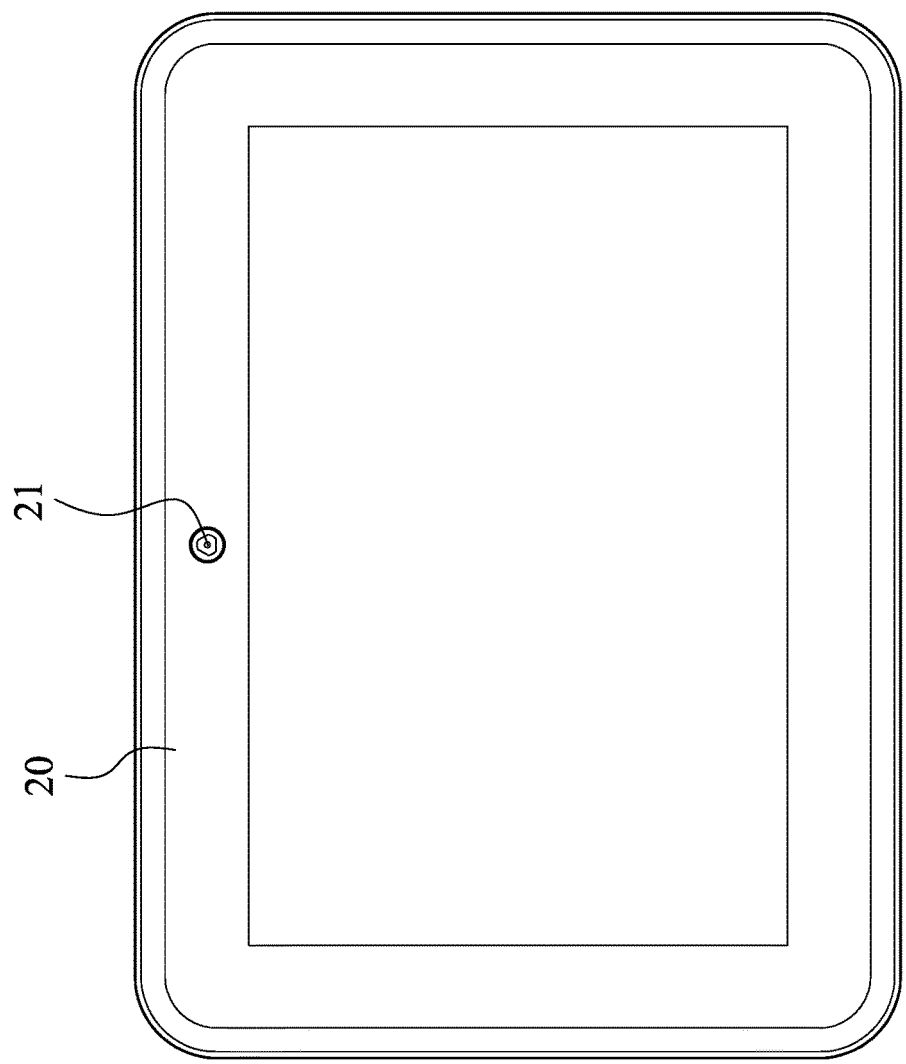
FIG. 21 shows an electronic device according to the 9th embodiment of the present disclosure.

FIG. 21 shows an electronic device 20 according to the 9th embodiment of the present disclosure. The electronic device 20 of the 9th embodiment is a tablet personal computer, wherein the electronic device 20 includes an image capturing apparatus 21. The image capturing apparatus 21 includes an imaging lens assembly (its reference numeral is omitted) according to the present disclosure and an image sensor (its reference numeral is omitted), wherein the image sensor is disposed on an image surface of the imaging lens assembly.

<10th Embodiment>

Figure 22:
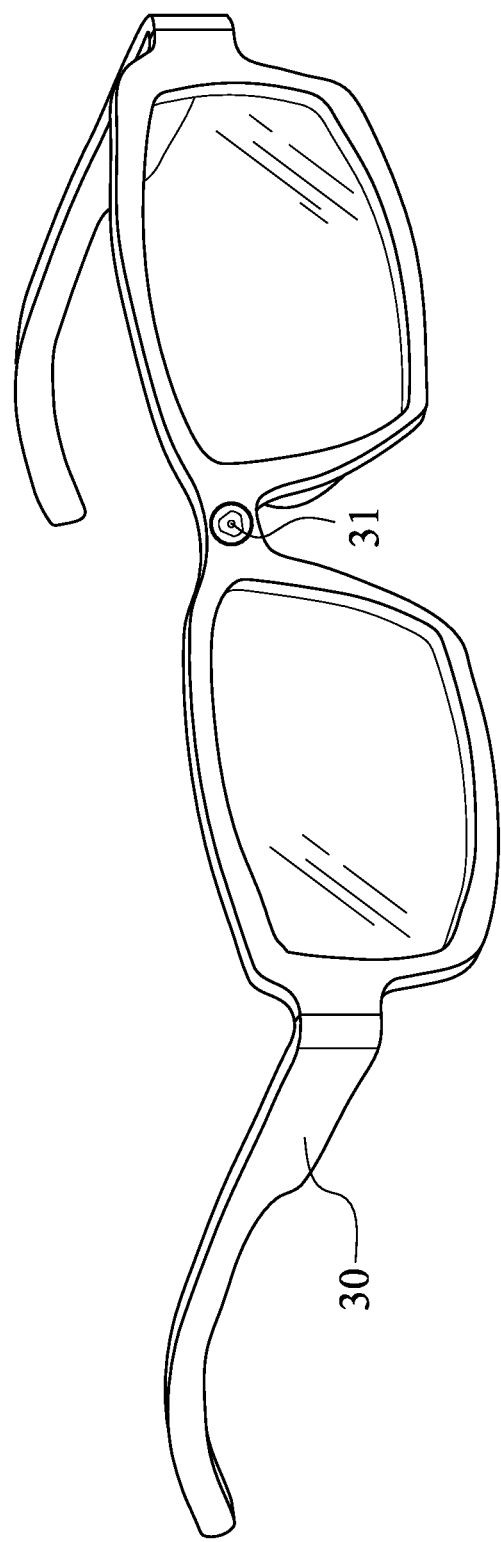
FIG. 22 shows an electronic device according to the 10th embodiment of the present disclosure.

FIG. 22 shows an electronic device 30 according to the 10th embodiment of the present disclosure. The electronic device 30 of the 10th embodiment is a wearable device, wherein the electronic device 30 includes an image capturing apparatus 31. The image capturing apparatus 31 includes an imaging lens assembly (its reference numeral is omitted) according to the present disclosure and an image sensor (its reference numeral is omitted), wherein the image sensor is disposed on an image surface of the imaging lens assembly.

The foregoing description, for purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising, in order from an object side to an image side:
   a first lens element;
   a second lens element;
   a third lens element having positive refractive power;
   a fourth lens element;
   a fifth lens element having an object-side surface and an image-side surface being both aspheric; and
   a sixth lens element with negative refractive power having an object-side surface being concave in a paraxial region thereof, wherein the object-side surface and an image-side surface of the sixth lens element are aspheric;

wherein the imaging lens assembly has a total of six lens elements, there is an air gap between every adjacent lens elements of the imaging lens assembly;

wherein an incident angle of a chief ray at a maximum image height on an image surface of the imaging lens assembly is CRA1.0Y, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, an axial distance between the fourth lens element and the fifth lens element is T45, an axial distance between the fifth lens element and the sixth lens element is T56, and the following conditions are satisfied:

38.0 degrees≤CRA1.0Y;

|f6|<|f3|<|f1|;

|f6|<|f3|<|f2|;

|f6|<|f3|<|f4|;

|f6|<|f3|<|f5|; and 0.70<T56/T45.

2. The imaging lens assembly of claim 1, wherein the first lens element has positive refractive power, and the second lens element has negative refractive power.

3. The imaging lens assembly of claim 1, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, at least three of V1, V2, V3, V4, V5 and V6 are greater than 50, an f-number of the imaging lens assembly is Fno, and the following condition is satisfied:

1.0<Fno<4.0.

4. The imaging lens assembly of claim 1, wherein a maximum value among maximum effective radii of object-side surfaces and image-side surfaces of the first lens element, the second lens element, the third lens element, the fourth lens element, the fifth lens element and the sixth lens element is SDmax, a minimum value among maximum effective radii of object-side surfaces and image-side surfaces of the first lens element, the second lens element, the third lens element, the fourth lens element, the fifth lens element and the sixth lens element is SDmin, and the following condition is satisfied:

2.75<SDmax/SDmin<6.0.

5. The imaging lens assembly of claim 1, wherein the incident angle of the chief ray at the maximum image height on the image surface of the imaging lens assembly is CRA1.0Y, and the following condition is satisfied:

40.0 degrees<CRA1.0Y<62.5 degrees.

6. The imaging lens assembly of claim 1, wherein a half of a maximal field of view of the imaging lens assembly is HFOV, the incident angle of the chief ray at the maximum image height on the image surface of the imaging lens assembly is CRA1.0Y, and the following condition is satisfied:

0<HFOV/CRA1.0Y<1.0.

7. The imaging lens assembly of claim 1, wherein the sixth lens element has the image-side surface being concave in a paraxial region thereof, and the image-side surface of the sixth lens element comprises at least one convex shape in an off-axial region thereof.

8. The imaging lens assembly of claim 1, wherein an axial distance between an object-side surface of the first lens element and the image surface is TL, the incident angle of the chief ray at the maximum image height on the image surface of the imaging lens assembly is CRA1.0Y, the maximum image height of the imaging lens assembly is ImgH, and the following condition is satisfied:

0<TL/(tan(CRA1.0Y)×ImgH)<2.0.

9. The imaging lens assembly of claim 1, wherein an entrance pupil diameter of the imaging lens assembly is EPD, an axial distance between the image-side surface of the sixth lens element and the image surface is BL, and the following condition is satisfied:

1.25<EPD/BL<5.0.

10. The imaging lens assembly of claim 1, further comprises:

an aperture stop, wherein an axial distance between the aperture stop and the image-side surface of the sixth lens element is SD, the maximum image height of the imaging lens assembly is ImgH, and the following condition is satisfied:

0.80<SD/ImgH<1.50.

11. The imaging lens assembly of claim 1, wherein a displacement in parallel with an optical axis from an axial vertex on the image-side surface of the sixth lens element to a maximum effective radius position on the image-side surface of the sixth lens element is SAG62, a central thickness of the sixth lens element is CT6, and the following condition is satisfied:

−3.0<SAG62/CT6<−0.75.

12. The imaging lens assembly of claim 1, wherein the axial distance between the fourth lens element and the fifth lens element is T45, the axial distance between the fifth lens element and the sixth lens element is T56, and the following condition is satisfied:

1.25<T56/T45<125.

13. The imaging lens assembly of claim 1, wherein the axial distance between the fifth lens element and the sixth lens element is T56, a displacement in parallel with an optical axis from an axial vertex on the image-side surface of the fifth lens element to a maximum effective radius position on the image-side surface of the fifth lens element is SAG52, a displacement in parallel with the optical axis from an axial vertex on the object-side surface of the sixth lens element to a maximum effective radius position on the object-side surface of the sixth lens element is SAG61, and the following condition is satisfied:

3.0<T56/(T56−SAG52+SAG61)<100.

14. The imaging lens assembly of claim 1, wherein a maximum effective radius of the image-side surface of the sixth lens element is SD62, an entrance pupil diameter of the imaging lens assembly is EPD, and the following condition is satisfied:

1.65≤SD62/EPD<5.0.

15. The imaging lens assembly of claim 1, wherein a curvature radius of the object-side surface of the sixth lens element is R11, a curvature radius of the image-side surface of the sixth lens element is R12, and the following condition is satisfied:

(R11+R12)/(R11−R12)<−0.50.

16. An image capturing apparatus, comprising:
the imaging lens assembly of claim 1; and
an image sensor, wherein the image sensor is disposed on the image surface of the imaging lens assembly.

17. An electronic device, comprising:
the image capturing apparatus of claim 16.

18. An imaging lens assembly comprising, in order from an object side to an image side:
a first lens element;
a second lens element;
a third lens element;
a fourth lens element;
a fifth lens element; and
a sixth lens element having an object-side surface being concave in a paraxial region thereof;
wherein the imaging lens assembly has a total of six lens elements, there is an air gap between every adjacent lens elements of the imaging lens assembly;
wherein the imaging lens assembly further comprises an aperture stop disposed between an imaged object and the third lens element, at least one surface of at least one lens element of the first lens element, the second lens element, the third lens element, the fourth lens element, the fifth lens element and the sixth lens element comprises at least one critical point;
wherein an incident angle of a chief ray at a maximum image height on an image surface of the imaging lens assembly is CRA1.0Y, an axial distance between an object-side surface of the first lens element and the image surface is TL, the maximum image height of the imaging lens assembly is ImgH, an entrance pupil diameter of the imaging lens assembly is EPD, an axial distance between an image-side surface of the sixth lens element and the image surface is BL, a focal length of the first lens element is f1, a focal length of the third lens element is f3, a focal length of the sixth lens element is f6, and the following conditions are satisfied:

45.0 degrees<CRA1.0Y;

0<TL/(tan(CRA1.0Y)×ImgH)<2.0;

1.25<EPD/BL; and

|f6|<|f3|<|f1|;.

19. The imaging lens assembly of claim 18, wherein a maximum effective radius of the image-side surface of the sixth lens element is SD62, the entrance pupil diameter of the imaging lens assembly is EPD, and the following condition is satisfied:

1.65≤SD62/EPD<5.0.

20. The imaging lens assembly of claim 18, wherein a maximum value among maximum effective radii of object-side surfaces and image-side surfaces of the first lens element, the second lens element, the third lens element, the fourth lens element, the fifth lens element and the sixth lens element is SDmax, a minimum value among maximum effective radii of object-side surfaces and image-side surfaces of the first lens element, the second lens element, the third lens element, the fourth lens element, the fifth lens element and the sixth lens element is SDmin, and the following condition is satisfied:

2.75<SDmax/SDmin<6.0.

21. The imaging lens assembly of claim 18, wherein a half of a maximal field of view of the imaging lens assembly is HFOV, the incident angle of the chief ray at the maximum image height on the image surface of the imaging lens assembly is CRA1.0Y, and the following condition is satisfied:

0<HFOV/CRA1.0Y<1.0.

22. The imaging lens assembly of claim 18, wherein an axial distance between the aperture stop and the image-side surface of the sixth lens element is SD, the maximum image height of the imaging lens assembly is ImgH, and the following condition is satisfied:

0.80<SD/ImgH<1.50.

23. The imaging lens assembly of claim 18, wherein the entrance pupil diameter of the imaging lens assembly is EPD, the axial distance between the image-side surface of the sixth lens element and the image surface is BL, and the following condition is satisfied:

1.75<EPD/BL<4.0.

24. The imaging lens assembly of claim 18, wherein the incident angle of the chief ray at the maximum image height on the image surface of the imaging lens assembly is CRA1.0Y, and the following condition is satisfied:

50.0 degrees<CRA1.0Y<60.0 degrees.

25. The imaging lens assembly of claim 18, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, at least three of V1, V2, V3, V4, V5 and V6 are greater than 50, an f-number of the imaging lens assembly is Fno, and the following condition is satisfied:

1.0<Fno<4.0.

26. An image capturing apparatus, comprising:
the imaging lens assembly of claim 18; and
an image sensor, wherein the image sensor is disposed on the image surface of the imaging lens assembly.

27. An electronic device, comprising:
the image capturing apparatus of claim 26.

* * * * *